US011689869B2

(12) United States Patent
Jensen et al.

(10) Patent No.: US 11,689,869 B2
(45) Date of Patent: Jun. 27, 2023

(54) HEARING DEVICE CONFIGURED TO UTILIZE NON-AUDIO INFORMATION TO PROCESS AUDIO SIGNALS

(71) Applicant: Oticon A/S, Smørum (DK)

(72) Inventors: Jesper Bruun Jensen, Smørum (DK); Sigurdur Sigurdsson, Smørum (DK)

(73) Assignee: Oticon A/S, Smørum (DK)

( * ) Notice: Subject to any disclaimer, the term of this patent is extended or adjusted under 35 U.S.C. 154(b) by 0 days.

(21) Appl. No.: 17/379,571

(22) Filed: Jul. 19, 2021

(65) Prior Publication Data

US 2021/0352417 A1  Nov. 11, 2021

Related U.S. Application Data

(62) Division of application No. 16/557,120, filed on Aug. 30, 2019, now Pat. No. 11,122,373.

(30) Foreign Application Priority Data

Sep. 2, 2018 (EP) ..................................... 18192140

(51) Int. Cl.
*H04R 25/00* (2006.01)
*G10L 25/78* (2013.01)
(Continued)

(52) U.S. Cl.
CPC ......... *H04R 25/505* (2013.01); *G06V 40/168* (2022.01); *G10L 25/78* (2013.01);
(Continued)

(58) Field of Classification Search
CPC ..... G10L 25/78; G10L 21/0208; G10L 25/48; G06K 9/00268; H04N 5/2253;
(Continued)

(56) References Cited

U.S. PATENT DOCUMENTS 6,707,921 B2 * 3/2004 Moore ................... H04R 25/00
381/327
8,571,231 B2 * 10/2013 Ramakrishnan .... G10L 21/0208
381/94.1
(Continued)

FOREIGN PATENT DOCUMENTS

DE  10 2014 218 832 A1  3/2016
WO  WO 2007/052185 A3  5/2007
(Continued)

*Primary Examiner* — Brian Ensey
(74) *Attorney, Agent, or Firm* — Birch, Stewart, Kolasch & Birch, LLP

(57) ABSTRACT

A hearing device, e.g. a hearing aid, is configured to be worn by a user, e.g. fully or partially on the head of the user, comprises a) an input transducer for converting a sound comprising a target sound from a target talker and possible additional sound in an environment of the user, when the user wears the hearing device, to an electric sound signal representative of said sound, b) an auxiliary input unit configured to provide an auxiliary electric signal representative of said target signal or properties thereof, c) a processor connected to said input transducer and to said auxiliary input unit, and wherein said processor is configured to apply a processing algorithm to said electric sound signal, or a signal derived therefrom, to provide an enhanced signal by attenuating components of said additional sound relative to components of said target sound in said electric sound signal, or said signal derived therefrom. The auxiliary electric signal is derived from visual information, e.g. from a camera, containing information of current vibrations of a facial or throat region of said target talker, and the processing algorithm is configured to use the auxiliary electric signal or the signal derived therefrom to provide the enhanced signal.

19 Claims, 11 Drawing Sheets

(51) Int. Cl.
  *G06V 40/16* (2022.01)
  *H04N 23/54* (2023.01)
(52) U.S. Cl.
  CPC ........... *H04N 23/54* (2023.01); *H04R 25/558* (2013.01); *H04R 25/604* (2013.01); *H04R 2225/55* (2013.01)
(58) Field of Classification Search
  CPC .... H04R 25/55; H04R 25/505; H04R 25/604; H04R 25/558; H04R 2225/55; H04R 2225/43
  See application file for complete search history.

(56) References Cited

U.S. PATENT DOCUMENTS

| | | | |
|---|---|---|---|
| 9,094,749 B2 * | 7/2015 | Xie | G10L 25/93 |
| 2016/0183014 A1 * | 6/2016 | Guo | G06V 40/171 |
| | | | 381/313 |
| 2017/0351848 A1 | 12/2017 | Bakish | |
| 2018/0132044 A1 | 5/2018 | Boesen | |

FOREIGN PATENT DOCUMENTS

| WO | WO 2016/089745 A1 | 6/2016 |
|---|---|---|
| WO | WO 2016/150001 A1 | 9/2016 |

* cited by examiner

HEARING DEVICE CONFIGURED TO UTILIZE NON-AUDIO INFORMATION TO PROCESS AUDIO SIGNALS

CROSS-REFERENCE TO RELATED APPLICATIONS

This application is a Divisional of copending application Ser. No. 16/557,120, filed on Aug. 30, 2019, which claims priority under 35 U.S.C. § 119(a) to Application No. 18192140.4, filed in Europe on Sep. 2, 2018, all of which are hereby expressly incorporated by reference into the present application.

SUMMARY

The present disclosure relates to audio processing in a hearing device, e.g. a hearing aid, worn by a user, in particular to the use of non-audio information to enhance a signal containing speech and noise (e.g. enhance a user's intelligibility of a target speech component). In an embodiment, the present disclosure relates to enhancement of noisy speech using hearing aid microphones and a high-speed video camera focused at a target talker.

It is well-known that hearing aid users face problems in understanding speech in noisy conditions. Normally, the problem is reduced using beamforming or noise reduction algorithms. However, at low signal to noise ratios (SNRs), these solutions tend to fail. Unfortunately, it is in low SNR situations that the user needs good noise reduction/beamforming algorithms the most. The present disclosure presents a scheme for extending the SNR range (downwards), for which beamforming/noise reduction solutions work.

A hearing device:

In an aspect of the present application, a hearing device, e.g. a hearing aid, configured to be worn by a user, e.g. fully or partially on the head of the user, or to be fully or partially implanted in the head of the user is provided by the present disclosure. The hearing device comprises
  at least one input transducer for converting a sound comprising a target sound from a target talker and possible additional sound in an environment of the user, when the user wears the hearing device, to an electric sound signal representative of said sound,
  an auxiliary input unit configured to provide an auxiliary electric signal representative of said target signal or properties thereof,
  a processor connected to said input transducer and to said auxiliary input unit, and wherein said processor is configured to apply a processing algorithm, e.g. a noise reduction algorithm, to said electric sound signal, or a signal derived therefrom, to provide an enhanced signal by attenuating components of said additional sound relative to components of said target sound in said electric sound signal, or in said signal derived therefrom.

The hearing device is further configured to provide that the auxiliary electric signal is derived from visual information containing information of current vibrations of a facial or throat region of said target talker, and wherein said processing algorithm is configured to use said auxiliary electric signal or said signal derived therefrom to provide said enhanced signal.

Thereby an improved hearing device may be provided.

The vibrations of the facial or throat region will typically be due to the person talking, i.e. to activation and thereby vibration of the vocal cords. Vibrations of the vocal cords of a user may be sensed in the throat region on the skin around the vocal cords. Such vibrations may, however, also be sensed in other parts of the users' body, e.g. in the facial region. Vibrations of the vocal cords of a user may be sensed in a user's cheeks or chin, or outer ear (e.g. pinna). In particular, such vibrations may be sensed in the bony part of the user's cheek or chin. In an embodiment, vibrations in the facial or throat region above a certain threshold level are taken to be due to the person having activated the vocal cords, and hence is talking. Thereby vibrations having an origin other than vibration of the vocal cords can be ignored, e.g. from the environment (loud music or noise from machines or traffic (vehicles), etc. In an embodiment, the auxiliary electric signal is derived from visual information, e.g. provided by light sensitive sensor, containing information of a current vibration of the vocal cords of said target talker, and the processing algorithm is configured to use the auxiliary electric signal or the signal derived therefrom to provide the enhanced signal.

The term 'vibration' is in the present context taken to mean mechanical vibration (representative of sound, e.g. in a human audible frequency range, e.g. in the range between 20 Hz and 20 kHz). The maximum frequency of vibrations that can be captured by a camera is of the order of a frame rate of the camera. A threshold value of vibration as captured by a light sensitive sensor may be estimated as an expectation value of the energy of the sum of sample values of the auxiliary signal es(n), e.g. over a predetermined time (e.g. smaller than or equal to 100 ms, or smaller than or equal to 500 ms):

$$E[e_s(n)^2] = \Sigma_n (e_s(n))^2.$$

Where the summation is over the predetermined time.

In an embodiment, the use of the auxiliary signal in the estimation of an enhanced (target) signal is only enabled, when the estimation value E is larger than a threshold value $E_{th}$. The threshold value may be determined in advance of use of the hearing device by experiment of various examples of the user's voice alone, and relevant external sounds alone. Thereby non-own voice vibrations of the face (e.g. throat) can be separated from own-voice vibrations.

The hearing device may comprise a light sensitive sensor for providing the visual information. The light sensitive sensor may e.g. be constituted by or comprise a camera or a laser. The light sensitive sensor may provide said auxiliary electric signal.

The hearing device may comprise a camera, e.g. a video camera, for providing said visual information, or be configured to receive a wired or wireless signal containing said visual information (e.g. as an electric signal). The camera may provide said auxiliary electric signal. The camera may be a video camera (or any other device capable of recording images of an object with a predefined frequency, e.g. a smartphone, or a wearable camera, e.g. a head camera). The camera may be a separate device, or integrated with other functionality, e.g. in a smartphone or the like, or be integrated in the housing of the hearing device. The camera may be a miniature (video) camera. The (video) camera may have a frame rate ($f_s$) in the range between 250 Hz and 1 kHz. The camera may be a high speed video camera, e.g. having a frame rate larger than 1 kHz, such as larger than 2 kHz. The camera may be an infra-red camera. The camera may be a 3D camera. Frequencies of the vocal chords of human beings during vocal utterances (e.g. speech) are typically in the range between 50 Hz and 550 Hz. Average fundamental frequencies ($F_0$) are typically different for male, female and child species. Male fundamental frequencies are e.g. typically in the range from 85 Hz to 165 Hz, see e.g. EP2081405A1. During speech, the vocal cords (and its immediate surroundings, e.g. skin, tissue and bone) will at least vibrate with the fundamental frequency $F_0$, but higher harmonics ($F_n = nF_0$) will also be excited and be present in the speech signal of the talker together with a number of formant frequencies determined by the resonance properties (e.g. its form and dimensions) of the vocal tract of the target talker. For the purposes of signal processing in hearing aids, speech frequencies are generally taken to lie in the range below 8-10 kHz. A majority of speech frequencies of importance to a user's intelligibility of speech are below 5 kHz, and mainly below 3 kHz, such as below 2 kHz. At least some of these frequencies (a low-frequency part) will create corresponding vibrations in the facial region of the talker and be extractable by a video camera (including or) focused on the facial region (e.g. the throat and/or cheek or chin regions).

The camera may be adapted to be mounted on the head of the user (e.g. on a headband or spectacle frame). This has the advantage that the camera follows the head movements of the user wearing the hearing device. The camera may be adapted to be mounted in such a way that it is focused in a look direction of the user (the look direction being e.g. determined by a current direction of the nose of the user). The hearing device may comprise a housing wherein or whereon the camera is located. The camera may be located away from the user's body. An identification of the target talker, e.g. a direction to or a location of the target talker may be communicated to the camera, e.g. from the hearing device, e.g. as a direction from the user to the target talker (e.g. identified by the hearing device as the look direction of the user). Such 'direction of arrival' may be determined in a number of ways, see e.g. EP3267697A1. A location of the target talker or a direction to the target talker relative to the user may be identified by the user via a user interface.

The hearing device may be configured to select to receive the visual information from an appropriate one of a multitude of cameras in a given location (e.g. one that contains or is focused on the target talker of current interest to the user). The appropriate camera may be chosen based on an indication of a direction to or a location of the target talker relative to the user, e.g. as determined by an algorithm of the hearing device or indicated via a user interface.

The hearing device may comprise a carrier whereon the camera is mounted. The carrier comprises a housing of the hearing device, a spectacle frame, or a boom of a headset, an article of clothing, e.g. a headband, or a cap, or a clip, e.g. adapted to be attached to a piece of clothing.

The hearing device may comprise a user interface allowing a user to indicate a direction to or a location of a target talker of current interest to the user. The direction to or a location of a target talker of current interest to the user may be communicated to the camera and/or to processing algorithm (e.g. to a face tracking algorithm) to thereby select the target talker (e.g. among a multitude of persons present in a given sound scene (e.g. fully or partially within a field of view of the camera).

The hearing device may comprise a filter bank (or a multitude of filter banks, as the case may be) for decomposing the electric sound signal in frequency sub-bands, at least providing a low-frequency part and a high-frequency part of the electric sound signal. The filter bank may be a two-channel filter bank providing two frequency sub-bands. The filter bank may be configured to split the time domain-electric sound signal in any number of frequency sub-bands $N_{fb}$ larger than or equal to two, e.g. $\geq 8$, $\geq 16$, $\geq 64$, $\geq 128$ or more. The low-frequency part and the a high-frequency part of the electric sound signals may e.g. each comprise a number of frequency bands $N_{fb,LF}$ and $N_{fb,HF}$ selected among said $N_{fb}$ frequency bands. In an embodiment, $N_{fb} = N_{fb,LF} + N_{fb,HF}$.

The filter bank may consist of or comprise a low-pass filter and a high-pass filter providing the low-frequency part and the high-frequency part, respectively, of the electric sound signal, respectively. The low-pass filter and the high-pass filter may have identical cut-off frequencies.

The cut-off frequencies of the low-pass and high-pass filters of the filter bank are related to a frame-rate of the camera. The signal $e_s$ representing (video) information of vibrations of the vocal cords of the target talker will contain no signal components at frequencies higher than half a camera frame rate. The (e.g. 3 dB) cut-off frequencies may be taken to be (substantially) equal. The (e.g. 3 dB) cut-off frequencies may appropriately be set to half of the camera frame rate.

The hearing device may be configured to provide that an estimate of a high-frequency part $\hat{s}_{HF}$ of the enhanced signal is approximated by the unprocessed noisy high-frequency part $x_{HF}$ of the electric sound signal.

The hearing device may comprise an adaptive filter and a combination unit for estimating a low-frequency part $\hat{s}_{LF}$ of the enhanced signal from said low frequency part $x_{LF}$ of the electric sound signal and said auxiliary electric signal $e_s$.

The hearing device may comprise a synthesis filter bank for providing a resulting time domain-signal from a number of frequency sub-band signals (e.g. from an estimate $\hat{s}(k,m)$ of the target signal, where k and m are frequency and time (frame) indices, respectively). The hearing device according may comprise a synthesis filter bank or a sum unit for providing the enhanced signals from the low-frequency part $\hat{s}_{LF}$ and a high-frequency part $\hat{s}_{HF}$ of the enhanced signal.

The hearing device may comprise a feature extractor for extracting characteristic parameters of the electric input sound signal(s) from the auxiliary electric signal (from the light sensitive device, e.g. a camera). Characteristic parameters may include one or more of voice activity, fundamental frequency and voicing state.

The hearing device may comprise a voice activity detector for providing a voice activity indicator representing an estimate of whether or not, or with what probability, an input signal comprises a voice signal at a given point in time, and wherein the voice activity indicator is determined in dependence of the auxiliary electric signal or a signal derived therefrom. The voice activity indicator may be binary and set to indicate the presence or absence of voice in dependence of detected vibrations being larger than or smaller than a given threshold value. The threshold value may be different for different facial or throat regions. The voice activity indicator may be determined in dependence of the auxiliary electric signal as well as of the electric sound signal. Individual first and second preliminary voice activity indicators may be determined independently based on the auxiliary electric signal ($VAD_{aux}$) and on the electric sound signal ($VAD_{sound}$), respectively. A logic criterion (e.g. '$VAD_{aux}$ AND $VAD_{sound}$' for binary indicators, i.e. only indicate 'voice', when both indicators indicate 'voice') or by an average value for probabilistic indicators. Thereby a more robust voice activity indicator may be provided.

The hearing device may be configured to extract a fundamental frequency of the target sound from the auxiliary electric signal or said signal derived therefrom.

The hearing device may be configured to extract a voicing state from the auxiliary electric signal or said signal derived therefrom. A voicing state may e.g. be used to differ between voiced or unvoiced consonants.

The hearing device or the camera may comprise a face tracking algorithm to extract features of the face region of a person in a field of view of the camera. In an embodiment, the face tracking algorithm is executed in the auxiliary input unit, so that the auxiliary electric signal has been exposed to the face tracking algorithm. The face tracking algorithm may be executed in the camera, so that the received signal from the camera has been exposed to the face tracking algorithm. Face tracking algorithms are e.g. commonly used in state of the art cameras (e.g. in mobile telephones (e.g. smartphones)). The hearing device or the camera may comprise an eye tracking, or a mouth tracking algorithm. An algorithm for seeking out a particular area of the facial region of the target talker (e.g. the throat region or a cheek or chin region may e.g. be derived from a face or eye tracking algorithms using knowledge of a (possibly average) distance between eyes and throat, etc. or of the location of the throat, etc., in or relative to a (e.g. an average) face.

In an embodiment, the hearing device, e.g. the processing algorithm, is configured to use further information in addition to said auxiliary electric signal to provide said enhanced signal. Such further information may e.g. originate from movement of the lips of the target talker ('lip reading'), e.g. extracted from a camera including the face (e.g. mouth) of the target talker, e.g. derived from the same visual information used for detecting vibrations of the vocal cords of the target talker.

The hearing device may comprise an output unit for providing stimuli perceivable as sound to a user based on said enhanced signal ŝ.

The hearing device may e.g. be configured to provide that the auxiliary electric signal is used only when the hearing device is brought into a specific mode of operation (e.g. a 'boost noise reduction' mode representing a particularly difficult, e.g. multi talker or extraordinary noisy acoustic environment). The hearing device may e.g. be configured to provide that the use of the auxiliary signal in the estimation of an enhanced (target) signal is only enabled, when vibrations in the facial or throat region are above a certain threshold taken to be due to the person having activated the vocal cords, and hence is talking (or at least producing voiced vocalization). An activation of the specific mode of operation may e.g. be performed by a program shift, e.g. initiated via a user interface, e.g. implemented as an APP on a remote control device, e.g. a smartphone or other wearable device. In an embodiment, the light sensitive sensor (e.g. a camera) is only activated, when the hearing device is brought into the specific mode of operation. In an embodiment, the light sensitive sensor (e.g. a camera) is activated in a low-power mode (e.g. a camera with reduced frame rate), when the hearing device is not in the specific mode of operation.

The hearing device may be constituted by or comprise a hearing aid, a headset, an earphone, an ear protection device or a combination thereof. The hearing device may be constituted by or comprise a hearing aid, e.g. an air conduction type hearing aid, or a bone conduction type hearing aid, or a cochlear implant type of hearing aid.

In an embodiment, the hearing device is adapted to provide a frequency dependent gain and/or a level dependent compression and/or a transposition (with or without frequency compression) of one or more frequency ranges to one or more other frequency ranges, e.g. to compensate for a hearing impairment of a user. In an embodiment, the hearing device comprises a signal processor for enhancing the input signals and providing a processed output signal.

In an embodiment, the hearing device comprises an output unit for providing a stimulus perceived by the user as an acoustic signal based on a processed electric signal. In an embodiment, the output unit comprises a number of electrodes of a cochlear implant (for a CI type hearing device) or a vibrator of a bone conducting hearing device. In an embodiment, the output unit comprises an output transducer. In an embodiment, the output transducer comprises a receiver (loudspeaker) for providing the stimulus as an acoustic signal to the user (e.g. in an acoustic (air conduction based) hearing device). In an embodiment, the output transducer comprises a vibrator for providing the stimulus as mechanical vibration of a skull bone to the user (e.g. in a bone-attached or bone-anchored hearing device).

In an embodiment, the hearing device comprises an input unit for providing an electric input signal representing sound. In an embodiment, the input unit comprises an input transducer, e.g. a microphone, for converting an input sound to an electric input signal.

In an embodiment, the hearing device comprises a directional microphone system adapted to spatially filter sounds from the environment, and thereby enhance a target acoustic source among a multitude of acoustic sources in the local environment of the user wearing the hearing device. In an embodiment, the directional system is adapted to detect (such as adaptively detect) from which direction a particular part of the microphone signal originates. This can be achieved in various different ways as e.g. described in the prior art. In hearing devices, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

In an embodiment, the input unit comprises a wireless receiver for receiving a wireless signal comprising sound and for providing an electric input signal representing said sound. The wireless signal may be transmitted from another device, e.g. another hearing device, or a microphone, or from a camera. In an embodiment, the hearing device comprises antenna and transceiver circuitry for wirelessly receiving and/or transmitting a direct electric input signal from and/or to another device, e.g. from an entertainment device (e.g. a TV-set), a communication device, a wireless microphone, another hearing device, or a camera.

In an embodiment, the communication between the hearing device and the other device is in the base band (audio frequency range, e.g. between 0 and 20 kHz). Preferably, communication between the hearing device and the other device is based on some sort of modulation at frequencies above 100 kHz. Preferably, frequencies used to establish a communication link between the hearing device and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). In an embodiment, the wireless link is based on a standardized or proprietary technology. In an embodiment, the wireless link is based on Bluetooth technology (e.g. Bluetooth Low-Energy technology), or similar proprietary technology.

In an embodiment, the hearing device is a portable device, e.g. a device comprising a local energy source, e.g. a battery, e.g. a rechargeable battery.

In an embodiment, the hearing device comprises a forward or signal path between an input unit (e.g. an input transducer, such as a microphone or a microphone system and/or direct electric input (e.g. a wireless receiver)) and an output unit, e.g. an output transducer. In an embodiment, the signal processor is located in the forward path. In an embodiment, the signal processor is adapted to provide a frequency dependent gain according to a user's particular needs. In an embodiment, the hearing device comprises an analysis path comprising functional components for analyzing the input signal (e.g. determining a level, a modulation, a type of signal, an acoustic feedback estimate, etc.). In an embodiment, some or all signal processing of the analysis path and/or the signal path is conducted in the frequency domain. In an embodiment, some or all signal processing of the analysis path and/or the signal path is conducted in the time domain.

In an embodiment, an analogue electric signal representing an acoustic signal is converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 µs, for $f_s$=20 kHz. In an embodiment, a number of audio samples are arranged in a time frame. In an embodiment, a time frame comprises 64 or 128 audio data samples. Other frame lengths may be used depending on the practical application.

In an embodiment, the hearing devices comprise an analogue-to-digital (AD) converter to digitize an analogue input (e.g. from an input transducer, such as a microphone) with a predefined sampling rate, e.g. 20 kHz. In an embodiment, the hearing devices comprise a digital-to-analogue (DA) converter to convert a digital signal to an analogue output signal, e.g. for being presented to a user via an output transducer.

In an embodiment, the hearing device, e.g. the microphone unit, and or the transceiver unit comprise(s) a TF-conversion unit for providing a time-frequency representation of an input signal. In an embodiment, the time-frequency representation comprises an array or map of corresponding complex or real values of the signal in question in a particular time and frequency range. In an embodiment, the TF conversion unit comprises a filter bank for filtering a (time varying) input signal and providing a number of (time varying) output signals each comprising a distinct frequency range of the input signal. In an embodiment, the TF conversion unit comprises a Fourier transformation unit for converting a time variant input signal to a (time variant) signal in the (time-)frequency domain. In an embodiment, the frequency range considered by the hearing device from a minimum frequency $f_{min}$ to a maximum frequency $f_{max}$ comprises a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. In an embodiment, a signal of the forward and/or analysis path of the hearing device is split into a number NI of frequency bands (e.g. of uniform width), where NI is e.g. larger than 5, such as larger than 10, such as larger than 50, such as larger than 100, such as larger than 500, at least some of which are processed individually. In an embodiment, the hearing device is/are adapted to process a signal of the forward and/or analysis path in a number NP of different frequency channels (NP≤NI). The frequency channels may be uniform or non-uniform in width (e.g. increasing in width with frequency), overlapping or non-overlapping.

In an embodiment, the hearing device comprises a number of detectors configured to provide status signals relating to a current physical environment of the hearing device (e.g. the current acoustic environment), and/or to a current state of the user wearing the hearing device, and/or to a current state or mode of operation of the hearing device. Alternatively or additionally, one or more detectors may form part of an external device in communication (e.g. wirelessly) with the hearing device. An external device may e.g. comprise another hearing device, a remote control, and audio delivery device, a telephone (e.g. a smartphone), an external sensor, etc.

In an embodiment, one or more of the number of detectors operate(s) on the full band signal (time domain). In an embodiment, one or more of the number of detectors operate(s) on band split signals ((time-) frequency domain), e.g. in a limited number of frequency bands.

In an embodiment, the number of detectors comprises a level detector for estimating a current level of a signal of the forward path. In an embodiment, the predefined criterion comprises whether the current level of a signal of the forward path is above or below a given (L-)threshold value. In an embodiment, the level detector operates on the full band signal (time domain). In an embodiment, the level detector operates on band split signals ((time-) frequency domain).

In a particular embodiment, the hearing device comprises a voice detector (VD) for estimating whether or not (or with what probability) an input signal comprises a voice signal (at a given point in time). A voice signal is in the present context taken to include a speech signal from a human being. It may also include other forms of utterances generated by the human speech system (e.g. singing). In an embodiment, the voice detector unit is adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). In an embodiment, the voice detector is adapted to detect as a VOICE also the user's own voice. Alternatively, the voice detector is adapted to exclude a user's own voice from the detection of a VOICE.

In an embodiment, the hearing device comprises an own voice detector for estimating whether or not (or with what probability) a given input sound (e.g. a voice, e.g. speech) originates from the voice of the user of the system. In an embodiment, a microphone system of the hearing device is adapted to be able to differentiate between a user's own voice and another person's voice and possibly from NON-voice sounds.

In an embodiment, the number of detectors comprises a movement detector, e.g. an acceleration sensor. In an embodiment, the movement detector is configured to detect movement of the user's facial muscles and/or bones, e.g. due to speech or chewing (e.g. jaw movement) and to provide a detector signal indicative thereof.

In an embodiment, the hearing device comprises a classification unit configured to classify the current situation based on input signals from (at least some of) the detectors, and possibly other inputs as well. In the present context 'a current situation' is taken to be defined by one or more of a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);
b) the current acoustic situation (input level, feedback, etc.), and
c) the current mode or state of the user (movement, temperature, cognitive load, etc.);
d) the current mode or state of the hearing device (program selected, time elapsed since last user interaction, etc.) and/or of another device in communication with the hearing device.

In an embodiment, the hearing device further comprises other relevant functionality for the application in question, e.g. compression, noise reduction, feedback estimation/suppression, etc.

In an embodiment, the hearing device comprises a listening device, e.g. a hearing aid, e.g. a hearing instrument, e.g. a hearing instrument adapted for being located at the ear or fully or partially in the ear canal of a user, e.g. a headset, an earphone, an ear protection device or a combination thereof. In an embodiment, the hearing assistance system comprises a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing device as described above, in the 'detailed description of embodiments' and in the claims, is moreover provided. In an embodiment, use is provided in a system comprising audio distribution. In an embodiment, use is provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Hearing System:

In a further aspect, a hearing system, e.g. a hearing aid system, comprising a hearing device as described above, in the 'detailed description of embodiments', and in the claims, AND an auxiliary device is moreover provided.

The auxiliary device, may e.g. be or comprise a remote control, a smartphone, a video camera, etc. The auxiliary device, may e.g. be or comprise the light sensitive sensor (camera, laser, etc.).

In an embodiment, the hearing system is adapted to establish a communication link between the hearing device and the auxiliary device to provide that information (e.g. control and status signals, possibly audio signals) can be exchanged or forwarded from one to the other.

In an embodiment, the hearing system comprises an auxiliary device, e.g. a remote control, a smartphone, or other portable or wearable electronic device, such as a smartwatch or the like, or a light sensitive sensor, e.g. a camera, such as a video camera, a laser, etc.

In an embodiment, the auxiliary device is or comprises a remote control for controlling functionality and operation of the hearing device(s). In an embodiment, the function of a remote control is implemented in a smartphone, the smartphone possibly running an APP allowing to control the functionality of the audio processing device via the smartphone (the hearing device(s) comprising an appropriate wireless interface to the smartphone, e.g. based on Bluetooth or some other standardized or proprietary scheme).

In an embodiment, the auxiliary device is or comprises an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device.

In an embodiment, the auxiliary device is or comprises another hearing device. In an embodiment, the hearing system comprises two hearing devices adapted to implement a binaural hearing system, e.g. a binaural hearing aid system.

A Method:

In an aspect, a method of operating a hearing device, e.g. a hearing aid, configured to be worn by a user, e.g. fully or partially on the head of the user, or to be fully or partially implanted in the head of the user is furthermore provided by the present application. The method comprises converting a sound comprising a target sound from a target talker and possible additional sound in an environment of the user, when the user wears the hearing device, to an electric sound signal representative of said sound, providing an auxiliary electric signal representative of said target signal or properties thereof, applying a processing algorithm, e.g. a noise reduction algorithm, to said electric sound signal, or a signal derived therefrom, to provide an enhanced signal by attenuating components of said additional sound relative to components of said target sound in said electric sound signal, or in said signal derived therefrom, deriving said auxiliary electric signal from visual information containing information of current vibrations of a facial or throat region of said target talker, and using said auxiliary electric signal or said signal derived therefrom to provide said enhanced signal.

It is intended that some or all of the structural features of the hearing device described above, in the 'detailed description of embodiments' or in the claims can be combined with embodiments of the method, when appropriately substituted by a corresponding process and vice versa. Embodiments of the method have the same advantages as the corresponding devices.

An APP:

In a further aspect, a non-transitory application, termed an APP, is furthermore provided by the present disclosure. The APP comprises executable instructions configured to be executed on an auxiliary device to implement a user interface for a hearing device or a hearing system described above in the 'detailed description of embodiments', and in the claims. In an embodiment, the APP is configured to run on cellular phone, e.g. a smartphone, or on another portable device allowing communication with said hearing device or said hearing system.

The user interface is configured to allow a user to activate a specific (boost) mode of operation of the hearing device, wherein the auxiliary signal is used to estimate at least a part of a target signal.

The user interface is configured to allow a user to select a target talker in a current acoustic environment. The user interface is configured to allow a user to indicate a direction to or a location of a target talker relative to the user. The user interface is configured to communicate the direction to or the location of a currently selected target talker relative to the user to a light sensitive device, e.g. a video camera.

Definitions:

In the present context, a 'hearing device' refers to a device, such as a hearing aid, e.g. a hearing instrument, or an active ear-protection device, or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing device' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing device may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing device may comprise a single unit or several units communicating electronically with each other. The loudspeaker may be arranged in a housing together with other components of the hearing device, or may be an external unit in itself (possibly in combination with a flexible guiding element, e.g. a dome-like element).

More generally, a hearing device comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output unit for providing an audible signal to the user in dependence on the processed audio signal. The signal processor may be adapted to process the input signal in the time domain or in a number of frequency bands. In some hearing devices, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing device and/or for storing information (e.g. processed information, e.g. provided by the signal processing circuit), e.g. for use in connection with an interface to a user and/or an interface to a programming device. In some hearing devices, the output unit may comprise an output transducer, such as e.g. a loudspeaker for providing an air-borne acoustic signal or a vibrator for providing a structure-borne or liquid-borne acoustic signal. In some hearing devices, the output unit may comprise one or more output electrodes for providing electric signals (e.g. a multi-electrode array for electrically stimulating the cochlear nerve). In an embodiment, the hearing device comprises a speakerphone (comprising a number of input transducers and a number of output transducers, e.g. for use in an audio conference situation).

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal to the cochlear liquid, e.g. through the oval window. In some hearing devices, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing device, e.g. a hearing aid, may be adapted to a particular user's needs, e.g. a hearing impairment. A configurable signal processing circuit of the hearing device may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing device via an interface to a programming device (fitting system), and used by a processing algorithm executed by the configurable signal processing circuit of the hearing device.

A 'hearing system' refers to a system comprising one or two hearing devices, and a 'binaural hearing system' refers to a system comprising two hearing devices and being adapted to cooperatively provide audible signals to both of the user's ears. Hearing systems or binaural hearing systems may further comprise one or more 'auxiliary devices', which communicate with the hearing device(s) and affect and/or benefit from the function of the hearing device(s). Auxiliary devices may be e.g. remote controls, audio gateway devices, mobile phones (e.g. smartphones), or music players. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person. Hearing devices or hearing systems may e.g. form part of or interact with public-address systems, active ear protection systems, handsfree telephone systems, car audio systems, entertainment (e.g. karaoke) systems, teleconferencing systems, classroom amplification systems, etc.

Embodiments of the disclosure may e.g. be useful in applications such as applications.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1A:
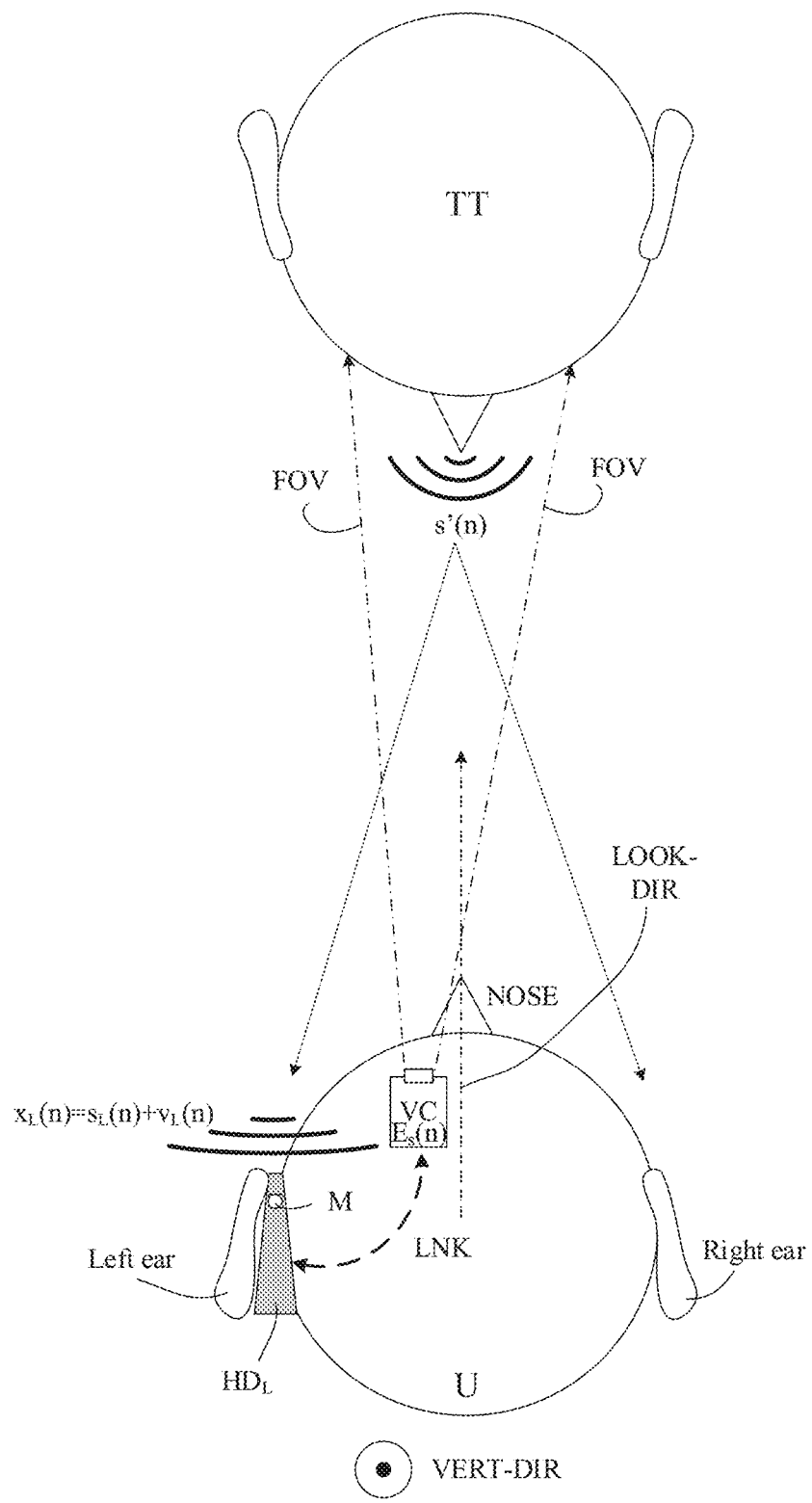
FIG. 1A shows a top view of an embodiment of a use case of a hearing aid system according to the present disclosure.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices, e.g. hearing aids, in particular to the improvement of speech intelligibility in difficult listening situations, e.g. situations exhibiting a low signal to noise ratio (SNR). It is proposed to combine traditional noise reduction algorithms (aiming at modifying a noisy speech signal to improve a user's intelligibility thereof) with the use of additional information (not derived from the acoustic signal as such, and hence—ideally—not disturbed by a low SNR of the acoustic signal), e.g. based on optical signals, e.g. images/video data.

The use of visual face/mouth information of a target talker in combination with microphone signals is e.g. dealt with in EP3028475A1. Furthermore, in [1] it was demonstrated that sound signals may be somewhat reconstructed based on the tiny vibrations—as picked up by a high-speed camera—of light surfaces, e.g. a bag of chips lying on a table, or the leaves of a plant. However, the idea proposed in the present disclosure is different in the sense that it reconstructs a clean speech signal based on a visual and an audio signal ([1] reconstructs audio entirely from video). The proposed idea is special in that it focuses exclusively on a vibrating surface of particular interest, e.g. the throat region of the target talker.

Another class of methods exists, which tries to reconstruct speech from a video recording of a target talker, e.g. [2]. However, these methods are active, in that they require a signal, e.g. a laser, to be shined on the target talker. These methods then reconstruct speech from the reflected laser signal. The proposed methods is passive in the sense that it does not involve any interference with the target talker.

According to the present disclosure, a user is equipped with a hearing device or system (e.g. a hearing aid or a hearing aid system), which comprises one or more microphones, and a (high-speed) video camera focused towards a target talker. It is proposed to use visual information picked up by the camera, to help enhance the noisy speech signals picked up by the microphones. However, in contrast to existing audio-visual approaches, which may use face/mouth information of the target talker to help guide the speech enhancement algorithm, the proposed idea uses visual information from the throat area of the target talker.

More specifically, with a high-speed video camera focusing at the throat of the target talker, it may be possible to detect and record the vibrations of the skin, related to the vibration (or absence thereof) of the vocal cords of the target talker (see FIG. 1). This video signal provides instantaneous information about the produced speech sound, which cannot be extracted by a face/mouth visual signal. Hence, this throat signal may be used in combination with face/mouth information or in a stand-alone configuration to help enhance the noisy signals picked up by the microphones of the hearing aid system. The proposed idea requires a video camera focused towards the throat of the target talker—modern face tracking algorithms allow the detection/tracking of faces in the video stream. Furthermore, additional algorithms can be used to detect facial features (e.g., eyes, mouth, etc.)—it is a fairly simple matter to adapt such algorithms to localize the throat region.

FIG. 1A shows a top view (cf. VERT-DIR indication perpendicular to the view) of a use case of an embodiment of a hearing aid system according to the present disclosure. FIG. 1A shows a hearing aid system (HS) comprising hearing device ($HD_L$) worn by a user (U) (here at a left ear of the user) and a (high-speed) video camera (VC) pointing away from the body of the hearing aid user (U), focused towards a target talker (TT) providing a target (speech) signal s'(n), where n represents time (e.g. a time index). The hearing device ($HD_L$) comprises at least one microphone (M) for picking up sound from the environment. The goal is to retrieve clean target signal components $s_L(n)$ from the noisy signal $x_L(n)$ as recorded by the hearing aid microphone (M). The signal $x_L(n)$ picked up by the microphone of the hearing devices comprises the voice (e.g. speech) of the target talker (TT) (propagated from the talker to the hearing device microphone). The (clean) speech of the target talker as at the microphone (M) is denoted $s_L(n)$. Additionally, the signal $x_L(n)$ comprises possible noise $v_L(n)$ from the environment. The video camera (VC) has in its field of view (FOV) (is e.g. focused at) the face, and e.g. in particular at the throat, or cheek or chin, of the target talker (TT). The field if view (FOV) is represented by dash dotted arrows from the camera (VC) pointing at the target talkers' head. A (preferably, high speed) video signal with frame rate $f_{s,cam}$ is picked up by the camera and represented by electrical signal $e_s(n)$, and made accessible to the hearing device(s) (or hearing aid system), e.g. for use in a noise reduction algorithm as described in the present disclosure. The microphone signal can thus be expressed as $x_L(n)=s_L(n)+v_L(n)$, corresponding to signals received at the microphone (M).

The video camera (VC) may e.g. be mounted on the user (U), e.g. on the user's head, e.g. on a headband or on a spectacle frame (see e.g. FIG. 3A, 3B, 3C), or integrated with one of the hearing devices or connected to the hearing devices via a wireless or wired connection (cf. wireless link (LNK) in FIG. 1A). The mounting on the head of the user has the advantage that the focus of the camera may follow the head rotation of the user, so that it (for example) is focused on the object (e.g. a person, e.g. the target talker) that the user is currently looking at (and assumingly paying attention to), cf. look direction (LOOK-DIR) in FIG. 1A of the user (U). In an embodiment, each of the hearing devices ($HD_L$, $HD_R$) comprises or is connected to a camera (e.g. to different cameras). In an embodiment, each hearing device is configured to use the information from the camera to enhance one of the microphone signals or a beamformed signal (e.g. formed as a (possibly complex) weighted combination of two or more microphone signals of the hearing device or system in question, see e.g. FIG. 5B, 5C).

The video camera may or may not form part of the hearing device or the hearing aid system. In an embodiment, the hearing aid system (e.g. a hearing aid) comprises an interface to a video camera and is configured to receive (video) data from a video camera. The video camera may be located in a fixed position (possibly mounted in a way allowing rotation around one or more axes) or moved by an operator.

Figure 1B:
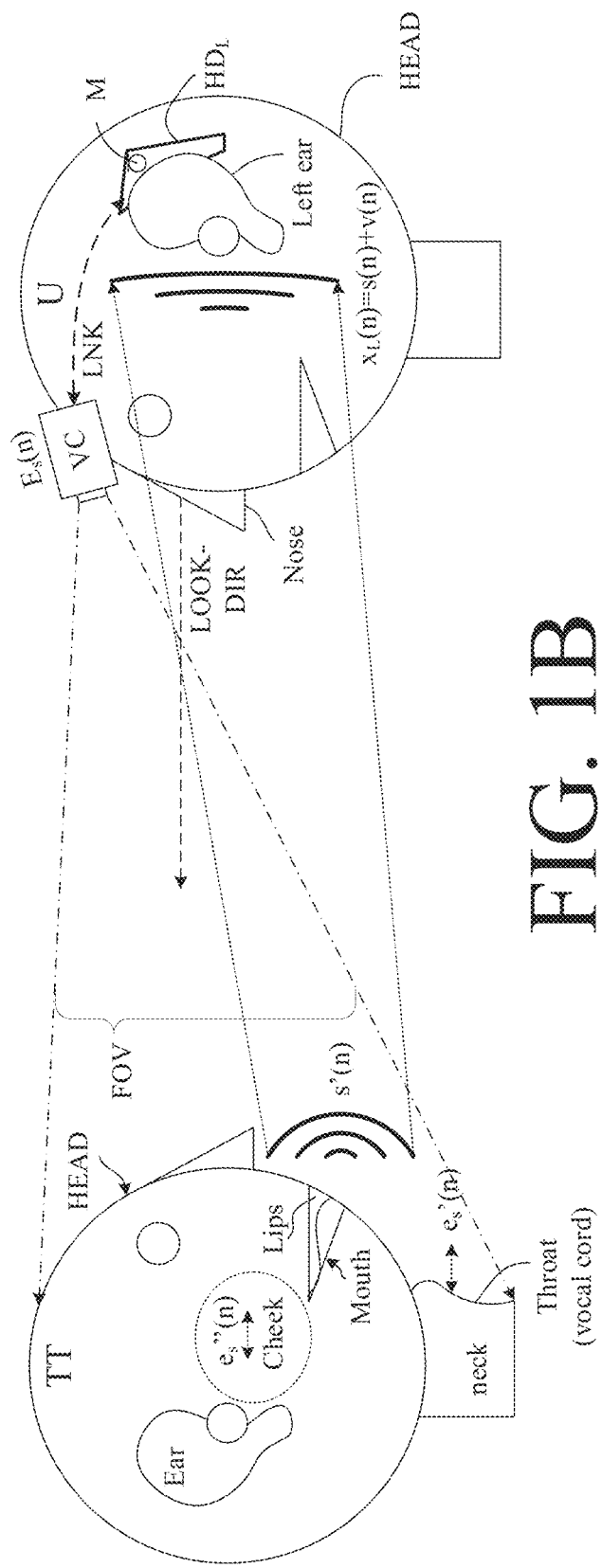
FIG. 1B shows a side view of an embodiment of a use case of a hearing aid system according to the present disclosure.

The hearing device of FIG. 1A, 1B is shown as a BTE-part adapted to be located at or behind an ear (pinna). It may further comprise an ITE-part, e.g. a customized mould connected to the BTE part via an acoustically guiding tube, or comprising a loudspeaker connected to the BTE-part via a cable comprising electrical conductors. The hearing device may be constituted by any other appropriate hearing aid style, be it of an air conduction type, a cochlear implant type or a bone conduction type.

FIG. 1B shows a side view of an embodiment of a use case of a hearing aid system according to the present disclosure. The view of FIG. 1B is a side view (looking on the left side of the head of the user (U), i.e. on the right side of the head of the target talker (TT)) of the system and scenario illustrated from the top in FIG. 1A. The signals and components of FIG. 1B are the same as depicted in FIG. 1A and discussed above. The field of view (FOV) of the video camera (VC) is indicated in a vertical direction to include the head and throat region of the target talker (TT). Vibrations of the vocal cords are visible (extractable) in the facial region, e.g. at the throat (Throat (vocal cord), signal $e'_s(n)$) or at a cheek (Cheek, signal $e''_s(n)$), or chin (not shown) of the target talker (TT).

Figure 2A:
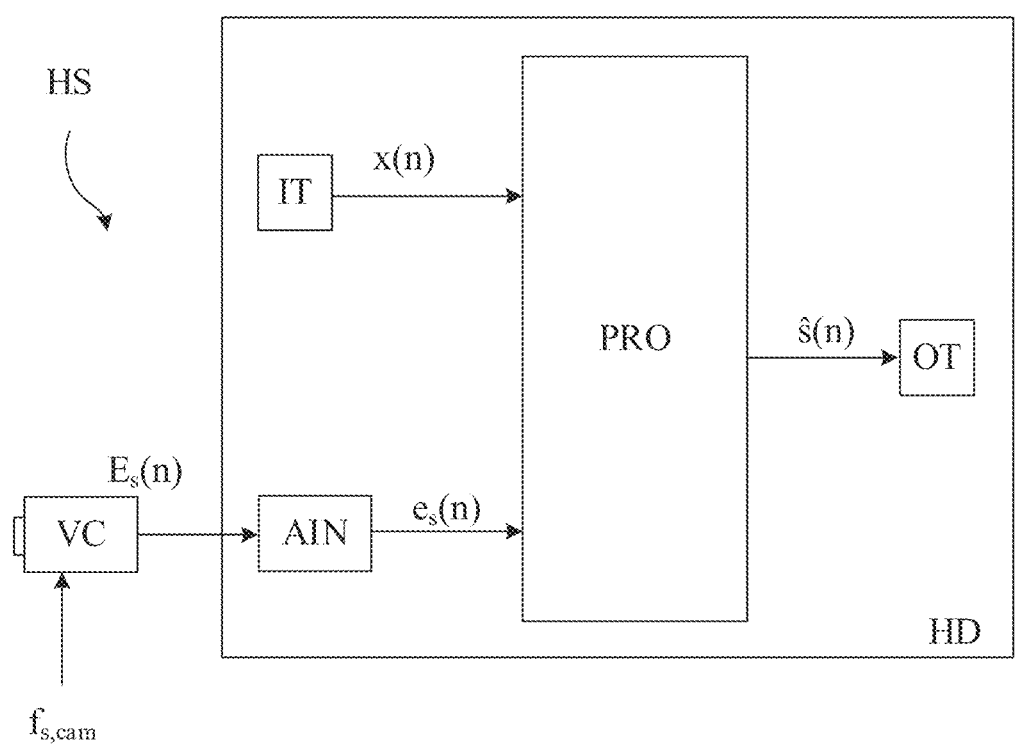
FIG. 2A shows an embodiment of a hearing aid system comprising an adaptive-filter based system to produce an enhanced target signal, ŝ(n), based on microphone signal x(n) and on vibration signal $e_s(n)$ derived from throat video signal.
Figure 2B:
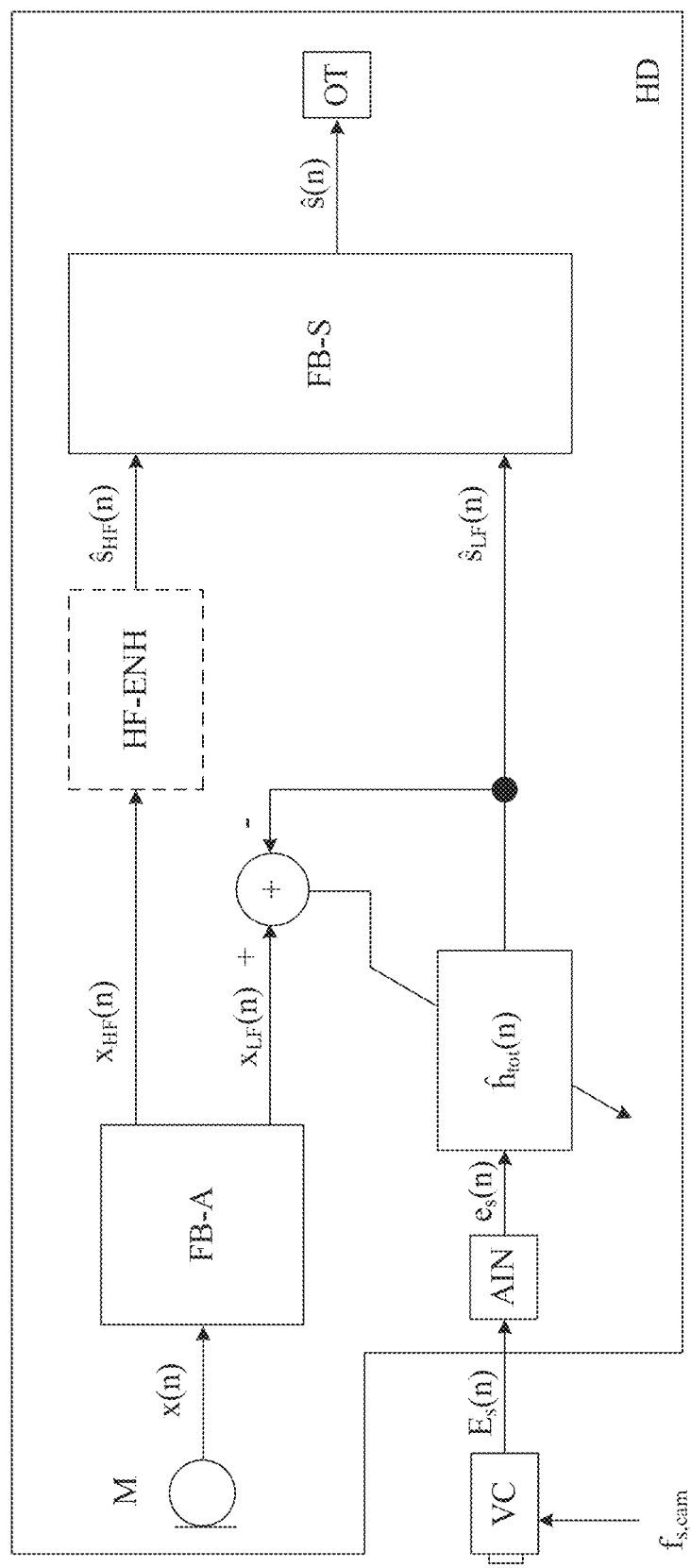
FIG. 2B shows an exemplary more detailed embodiment of the hearing aid system of FIG. 2A.

FIG. 2A shows an embodiment of a hearing aid system (HS) configured to produce an enhanced target signal s(n) (estimate ŝ) based on a signal x(n), the electric sound signal from input transducer (IT) (e.g. from microphone (M) in FIG. 2B) and on an auxiliary electric signal in the form of vibration signal $e_s(n)$ derived from a throat video signal (and/or a video signal comprising other regions containing vibrations originating from the vocal cords). The hearing aid system (HS) comprises a hearing aid (HD) comprising an input transducer (IT) for converting a sound in the environment of the hearing system to an electric sound signal x(n), which is fed to a processor (PRO). The hearing aid system further comprises a camera (VC) for providing an auxiliary electric signal $e_s(n)$ derived from visual information provided by a camera (VC) (exhibiting a frame rate of $f_{s,cam}$), containing information of the current vibration of the vocal cords of a target talker. The video camera (VC) is connected (by cable or wirelessly) to the hearing aid HD comprising an auxiliary input unit (AIN) comprising receiver circuitry for receiving signal $E_s(n)$ representing said target sound signal or characteristics thereof. The auxiliary input unit (AIN) provides the auxiliary electric signal $e_s(n)$, which is fed to the processor (PRO). The processor (PRO) is configured to enhance the (noisy) microphone signal x(n) using a processing algorithm, e.g. a noise reduction algorithm, configured to use the auxiliary electric signal $e_s(n)$ or a signal derived therefrom to provide the enhanced signal in the form of an estimate $\hat{s}(n)$ of the target signal s(n). The enhanced signal $\hat{s}(n)$ is fed to output transducer (OT) for providing stimuli based thereon and perceivable as sound to the user. The output transducer (OT) may e.g. comprise one or more of a loudspeaker, a vibrator, and a multi-electrode array.

FIG. 2B shows an exemplary more detailed embodiment of the hearing aid system of FIG. 2A comprising a hearing aid (HD) coupled to a video camera (VC). In the embodiment of FIG. 2B, the hearing aid system (HS) comprises an adaptive-filter based system to produce the enhanced target signal $\hat{s}(n)$. The hearing aid system comprises an analysis filter bank (FB-A) for converting the electric (time domain) sound signal x(n) provided by the input transducer (here a microphone (M)) as a number of frequency sub-band signals (here two) $x_{HF}(n)$ and $x_{LF}(n)$, respectively. The signal comprising frequencies above a cut-off frequency $f_{cut}$ is termed the high frequency part $x_{HF}(n)$ of the signal, whereas the signal comprising frequencies below the cut-off frequency $f_{cut}$ is termed the low frequency part $x_{LF}(n)$ of the signal.

In other words, the analysis filter bank (FB-A) decomposes the noisy microphone signal x(n) in a low-frequency part, $$x_{LF}(n)=s_{LF}(n)+v_{LF}(n),$$

and a high-frequency part, $$x_{HF}(n)=s_{HF}(n)+v_{HF}(n).$$

Figure 2C:
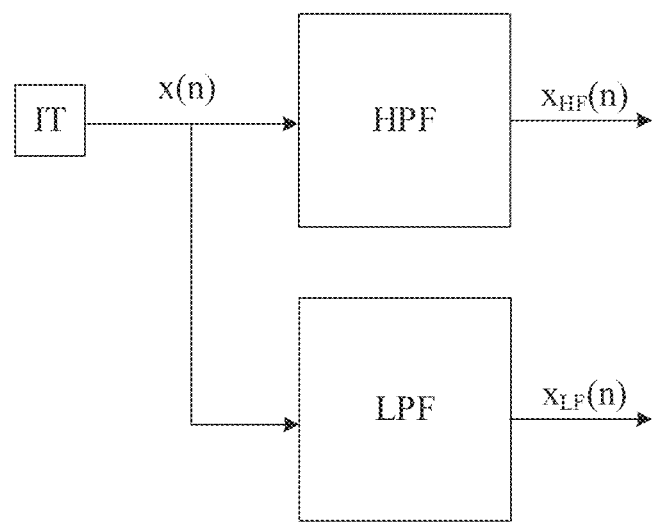
FIG. 2C shows an exemplary more detailed embodiment of the input stage comprising input transducer and analysis filter bank of the/hearing aid system of FIG. 2B.
Figure 2D:
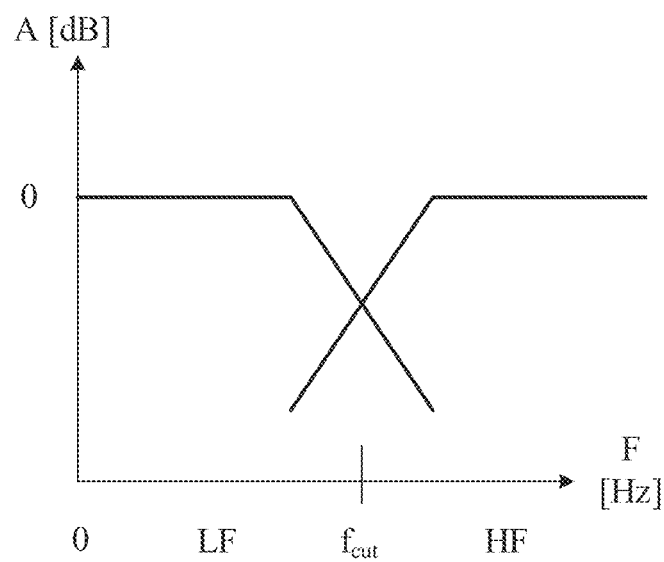
FIG. 2D schematically illustrates the filter characteristics of the high pass and low pass filters of the embodiment of an analysis filter bank of FIG. 2C.

The analysis filter bank essentially implements a low-pass and a high-pass filter with identical cut-off frequency ($f_{cut}$), see FIGS. 2C, 2D. The cut-off frequency of the filter bank may be related to the frame-rate $f_{s,cam}$ of the camera (VC). Specifically, $e_s(n)$ will contain no signal components at frequencies higher than half the camera frame rate. Hence, the cut-off frequency could, for example, be set to half of the camera frame rate ($f_{cut}=f_{s,cam}/2$). In some situations it is possible to increase the 'effective frame rate $f_{s,cam}$ to a higher value. The physical frame rate is unchanged, but the effective frame rate is increased by temporal interpolation using spatial information. Hereby the cut-off frequency can be increased (so that higher frequencies can be included in the LF-signal).

The focus of the embodiment of FIGS. 2A-2D is the retrieval of the low-frequency part of the clean signal, $s_{LF}(n)$, using $e_s(n)$. Retrieval of the high-frequency part of the clean signal, $s_{HF}(n)$, may be approached using other speech enhancement methods, e.g. single channel noise reduction, see e.g. [6,7].

An estimate of the combined impulse response vector, $h_{tot}(n)$, may be found using the adaptive filter setup depicted in FIG. 2B (or equivalently the frequency response by appropriate transforms to and from the frequency domain). The auxiliary electric signal $e_s$ is used to estimate $\hat{s}_{LF}$ the low frequency part of the target signal. The adaptive filter is coupled to minimize a squared difference between the low frequency part $x_{LF}$ of the noisy microphone signal and the estimated low frequency part $\hat{s}_{LF}$ of the target signal (($x_{LF}$-$\hat{s}_{LF}$)²). Thereby the vibration signal recorded by the camera is adapted to resemble the low-frequency part of the (clean) target signal recorded at the (reference) microphone. The auxiliary electric signal $e_s(n)$ from the video camera (VC) is fed to adaptive filter (denoted $\hat{h}_{tot}(n)$) providing as an output an estimate of the low-frequency part $\hat{s}_{LF}(n)$ of the target speech signal. An estimate of the filter coefficient vector $\hat{h}_{tot}(n)$ may be found adaptively, by minimizing the mean-squared error criterion (minimizing an expectation value of the squared difference between the correct value $s_{LF}$ of the LF-part of the target signal received at the microphone and the estimated value $\hat{s}_{LF}$ of same):

$$E[(s_{LF}(n)-h_{tot}(n)_T e_s(n))^2],$$

where E[ ] is the expectation operator, superscript $^T$ denotes vector transposition, and $e_s(n)$ should be read as vector of successive sample values of $e_s(n)$ up to and including the sample at time n. The dimension of vector $e_s(n)$ is obviously identical to that of vector $h_{tot}(n)$.

An adaptive estimate of vector $h_{tot}(n)$ may for example be found using variants of the well-known least-mean-square (1 ms) algorithm (see e.g. [8]), leading to filter coefficient estimates of the form $\hat{h}_{tot}(n)$:

$$\hat{h}_{tot}(n+1)=\hat{h}_{tot}(n)+\mu(n)e_s(n)[x_{LF}(n)-\hat{s}_{LF}(n)],$$

where we assumed that target and noise signals observed at the microphone(s) are uncorrelated, where $\mu(n)$ is a step-length parameter, which may be fixed or time-varying (signal-dependent) (cf. e.g. [8]), and where $$s_{LF}(n+1)=\hat{h}_{tot}(n+1)^T e_s(n+1).$$

In other words, the estimate of the filter coefficient vector $\hat{h}_{tot}(n)$ may be found adaptively, by minimizing an expectation value of the squared difference between the noisy value $x_{LF}$ of the LF-part of the target signal received at the microphone and the estimated value $\hat{s}_{LF}$ of the LF-part of the target signal provided by the adaptive filter $\hat{h}_{tot}$ (as illustrated in FIG. 2B).

Many other adaptive algorithms with better tracking/convergence properties are known [8] and can be used in this context.

Finally, the estimate of the low-frequency part of the clean signal, $\hat{s}_{LF}(n)$, and the estimate of the high-frequency part of the clean signal, $\hat{s}_{HF}(n)$, are combined to form the estimate, $\hat{s}(n)$, e.g. using a synthesis filter bank (FB-S), or simply by summing $\hat{s}_{LF}(n)$ and $\hat{s}_{HF}(n)$. Note that the estimate of the high-frequency clean signal content might simply be (approximated by) the unprocessed noisy high-frequency part of the signal, i.e., $\hat{s}_{HF}(n)=x_{HF}(n)$. Optionally, the high-frequency part of the signal, $\hat{s}_{HF}(n)$, may be provided from the unprocessed noisy high-frequency part of the signal, $x_{HF}(n)$, e.g. by single channel noise reduction ('post filtering'). The combined estimate $\hat{s}(n)$ of the target signal may be presented to the user via output transducer (OT), e.g. a loudspeaker, or may be further processed (e.g. by applying one or more processing algorithms, e.g. compressive amplification to compensate for a user's hearing impairment) before presentation.

FIG. 2C shows an exemplary more detailed embodiment of the input stage comprising input transducer (IT) and analysis filter bank (FB-A) of the hearing aid system of FIG. 2B. The analysis filter bank of FIG. 2B may be implemented by respective high pass and low pass filters (HPF, LPF) providing respective high frequency and low frequency parts ($x_{HF}(n)$, $x_{LF}(n)$) of the noisy input signal x(n) from the input transducer (IT).

FIG. 2D schematically illustrates exemplary filter characteristics of the high pass and low pass filters (HPF, LPF) of the embodiment of an analysis filter bank of FIG. 2C. The high pass (HPF) and low pass (LPF) filters are adapted to exhibit (substantially) identical (3 dB) cut-off frequencies $f_{cut}$. The cut-off frequency divides the operational part of the frequency axis on a low frequency range (LF) from $f_{min}$.

(e.g. 0 Hz) to $f_{cut}$ (e.g. 1 kHz) and a high frequency range (HF) from $f_{cut}$ to $f_{max}$ (e.g. 12 kHz).

The minimum frequency may e.g. be of the order of 20 Hz or 50 Hz. The maximum frequency may e.g. be of the order of 8 kHz or 10 kHz. The cut-off frequency may e.g. be of the order of 1 kHz or 2 kHz.

The solution described above uses the entire waveform $e_s(n)$ of the throat signal in the enhancement process. Other solutions may be envisioned, where, first, the signal $e_s(n)$ is analysed and certain features (characteristics) of the signal are extracted. These features may include a) speech activity (is the target talker speaking in the first place),
b) voicing state (i.e., to which extent are the vocal cords vibrating), and
c) fundamental frequency (i.e., if the vocal cords are vibrating, at which frequency).

Such features may be used as side information in speech enhancement systems to improve their performance (see e.g. [5.6]).

Figure 3A:
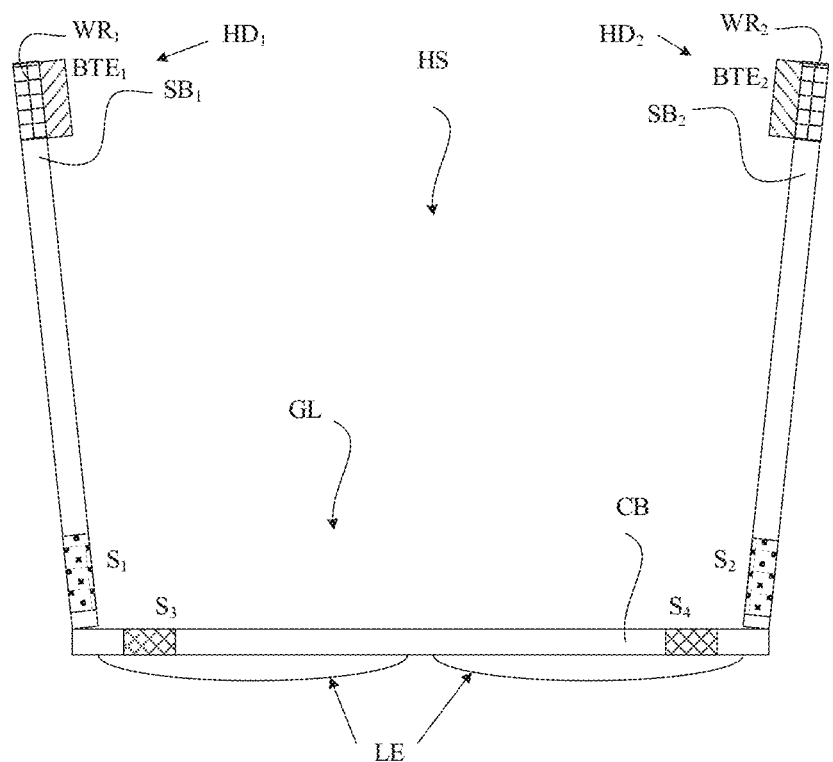
FIG. 3A shows a top view of an embodiment of a hearing aid system comprising first and second hearing devices integrated with a spectacle frame.
Figure 3B:
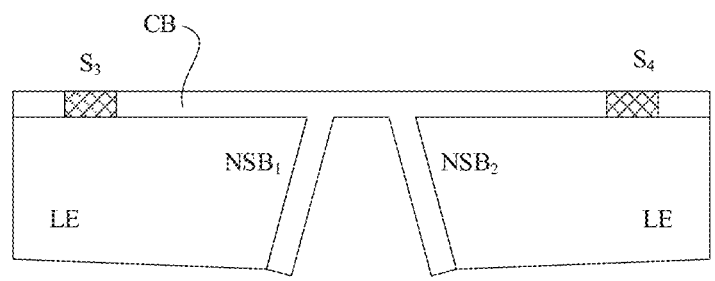
FIG. 3B shows a front view of the embodiment in FIG. 3A.
Figure 3C:
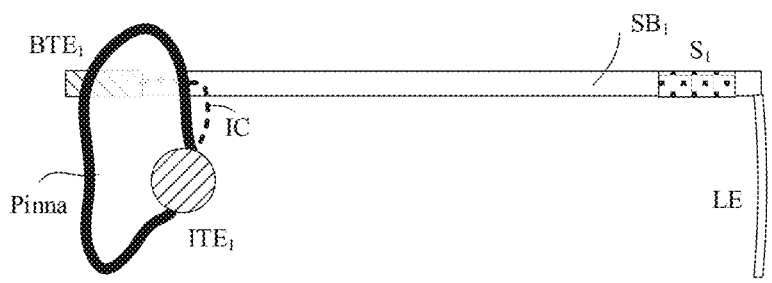
FIG. 3C shows a side view of the embodiment in FIG. 3A.

FIG. 3A shows a top view of a first embodiment of a hearing aid system (HS) comprising first and second hearing devices ($HD_1$, $HD_2$) integrated with a spectacle frame. FIG. 3B shows a front view of the embodiment in FIG. 3A, and FIG. 3C shows a side view of the embodiment in FIG. 3A.

The hearing aid system according to the present disclosure is configured to be worn on the head of a user and comprises a head worn carrier, here embodied in a spectacle frame.

The hearing aid system (HS) comprises left and right hearing devices ($HD_1$, $HD_2$) and a number of sensors, wherein at least some of the sensors are mounted on the spectacle frame. The hearing aid system (HS) comprises a number of sensors $S_i$, (i=1, ..., $N_S$) associated with (e.g. forming part of or connected to) left and right hearing devices ($HD_1$, $HD_2$), respectively. The number of sensors comprise at least one camera (e.g. a high-speed camera). Two or more (e.g. all) of the number of sensors $N_S$ (here four) may represent cameras, focused at different parts of the environment of the hearing aid system (i.e. of the user, when wearing the hearing aid system). In the example of FIG. 3A, 3B, 3C the distribution of sensors is symmetric, which need not necessarily be so, though). The first, second, third, and fourth sensors $S_1$, $S_2$, $S_3$, $S_4$ are mounted on a spectacle frame of the glasses (GL). In the embodiment of FIG. 3A, sensors $S_1$ and $S_2$ are mounted on the respective sidebars ($SB_1$ and $SB_2$), whereas sensors $S_3$ and $S_4$ are mounted on the cross bar (CB) having (e.g. hinged) connections to the right and left side bars ($SB_1$ and $SB_2$). Glasses or lenses (LE) of the spectacles may be mounted on the cross bar (CB) and nose sub-bars ($NSB_1$, $NSB_2$). The left and right hearing devices ($HD_1$, $HD_2$) comprises respective BTE-parts ($BTE_1$, $BTE_2$), and further comprise respective ITE-parts ($ITE_1$, $ITE_2$). Alternatively, at least one of the left and right hearing devices may comprise only a BTE part or only an ITE part, or be adapted to be fully or partially implanted in the head of the user. In an embodiment, the glasses comprises at least one camera mounted at the spectacle frame (e.g. on the cross bar) so that its focus follows the look direction of the user wearing the hearing aid system. In an embodiment, the hearing aid system is configured to select one of a multitude of cameras as the one to use in the enhancement of the electric sound signal received via the input transducer (e.g. IT in FIG. 2A), e.g. via a user interface, e.g. implemented as an APP of an auxiliary device, e.g. a smartphone, a smartwatch or the like.

Some or all microphones of the hearing aid system (HS) may be located on the (frame of the) glasses and/or on the BTE part, and or on an ITE-part. The ITE-parts may further e.g. comprise electrodes or other sensors for picking up body signals from the user, e.g. for monitoring physiological functions of the user, e.g. brain activity or eye movement activity or temperature, etc. The body signals may e.g. comprise Electroocculography (EOG) potentials and/or brainwave potentials, e.g. Electroencephalography (EEG) potentials, cf. e.g. EP3185590A1. The sensors mounted on the spectacle frame may (in addition to one or more cameras for picking up images of facial regions (e.g. including the throat region) of a target talker) e.g. comprise one or more of an accelerometer, a gyroscope, a magnetometer, a radar sensor, an eye camera (e.g. for monitoring pupillometry), or other sensors for localizing or contributing to localization of a sound source (or other landmark) of interest to the user wearing the hearing system and/or for identifying a target talker or a user's own voice.

The BTE- and ITE parts (BTE and ITE) of the hearing devices are electrically connected, either wirelessly or wired, as indicated by the dashed connection between them in FIG. 3C. The ITE part ($ITE_1$) may comprise a microphone (cf. $M_{ITE}$ in FIG. 4) and/or a loudspeaker (cf. SPK in FIG. 4) located in the ear canal during use.

While a camera pointed towards the target talker might allow both face, mouth, and throat information to be used, the proposed idea (using visually acquired information representing vibration of the vocal cords of the target talker) could be used in systems which i) rely only on such visual information, combined with the microphone signals picked up at the hearing aid user. A simplified system may be envisioned, which ii) rely exclusively on visual information representing vibrations of the vocal cords (e.g. throat information) (i.e., which does not use the microphone signals at all).

Figure 4:
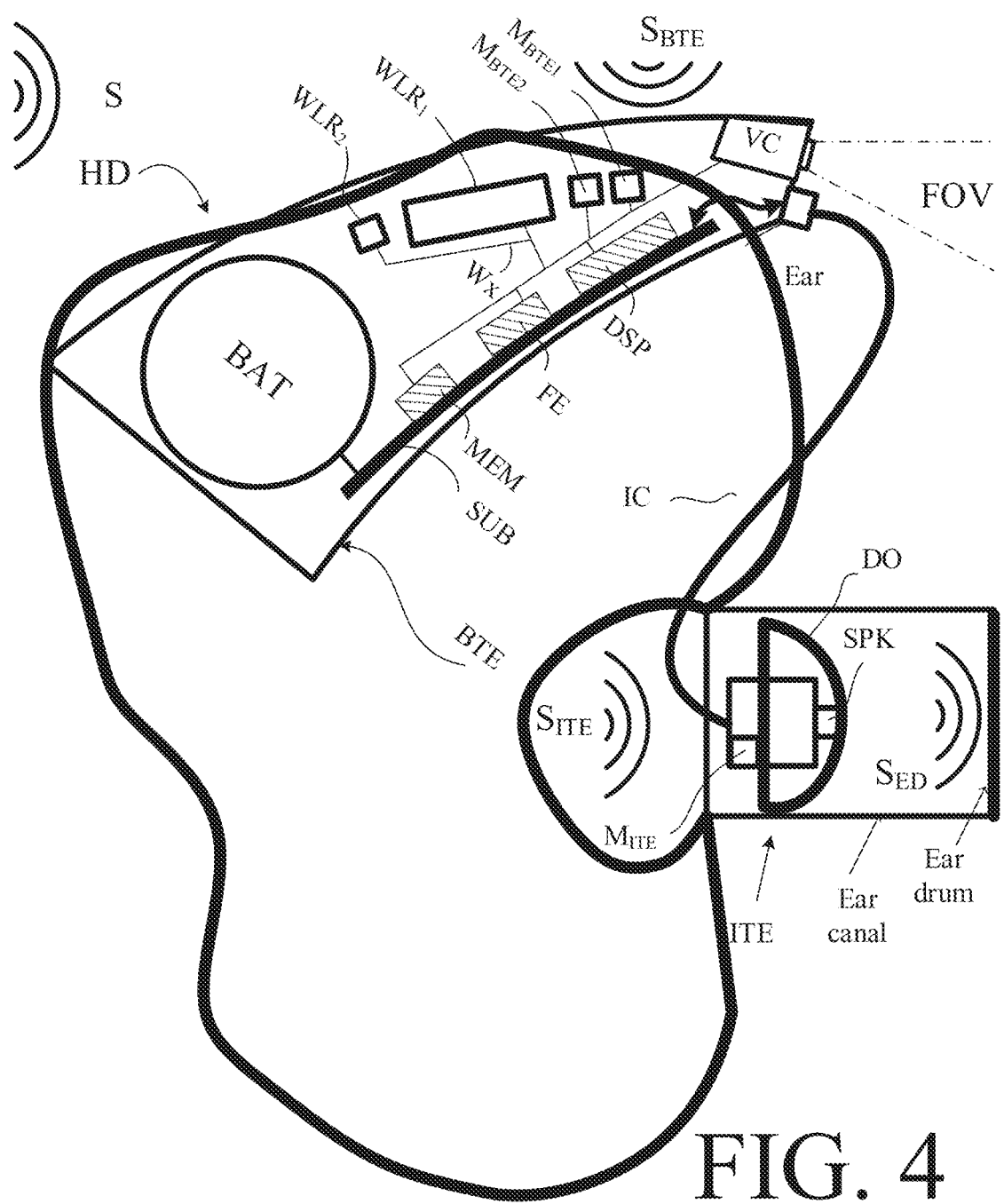
FIG. 4 shows an embodiment of a hearing device according to the present disclosure.

FIG. 4 shows an embodiment of a hearing device according to the present disclosure. The hearing device (HD), e.g. a hearing aid, is of a particular style (sometimes termed receiver-in-the ear, or RITE, style) comprising a BTE-part (BTE) adapted for being located at or behind an ear of a user, and an ITE-part (ITE) adapted for being located in or at an ear canal of the user's ear and comprising a receiver (loudspeaker). The BTE-part and the ITE-part are connected (e.g. electrically connected) by a connecting element (IC) and internal wiring in the ITE- and BTE-parts (cf. e.g. wiring $W_X$ in the BTE-part). The connecting element may alternatively be fully or partially constituted by a wireless link between the BTE- and ITE-parts (see e.g. FIG. 3C).

In the embodiment of a hearing device in FIG. 4, the BTE part comprises two input units comprising respective input transducers (e.g. microphones) ($M_{BTE1}$, $M_{BTE2}$), each for providing an electric input audio signal representative of an input sound signal ($S_{BTE}$) (originating from a sound field S around the hearing device). The input unit further comprises two wireless receivers ($WLR_1$, $WLR_2$) (or transceivers) for providing respective directly received auxiliary audio and/or control input signals (and/or allowing transmission of audio and/or control signals to other devices, e.g. a remote control or processing device). The input unit further comprises a video camera (VC) located in the housing of the BTE-part so that its field of view (FOV) is directed in a look direction of the user wearing the hearing device (here next to the electric interface to the connecting element (IC). The hearing device (HD) comprises a substrate (SUB) whereon a number of electronic components are mounted, including a memory (MEM) e.g. storing different hearing aid programs (e.g. parameter settings defining such programs, or parameters of algorithms, e.g. optimized parameters of a neural network) and/or hearing aid configurations, e.g. input source combinations ($M_{BTE1}$, $M_{BTE2}$, $WLR_1$, $WLR_2$, VC), e.g. optimized for a number of different listening situations. The auxiliary electric signal derived from visual information (e.g. from video camera VC) may be used in a mode of operation where it is combined with an electric sound signal from one of the input transducers (e.g. a microphone, e.g. $M_{BTE1}$). In another mode of operation, the auxiliary electric signal is used together with a beamformed signal provided by appropriately combining electric input signals from the first and second input transducers ($M_{BTE1}$, $M_{BTE2}$), e.g. by applying appropriate complex weights to the respective electric input signals (beamformer). In a mode of operation, the auxiliary electric signal is used as input to a processing algorithm (e.g. a single channel noise reduction algorithm) to enhance a signal of the forward path, e.g. a beamformed (spatially filtered) signal. In an embodiment, the auxiliary electric signal is used only when the hearing device is brought into a specific mode of operation (e.g. a 'boost noise reduction' mode representing a particularly difficult, e.g. multi talker or extraordinary noisy acoustic environment). An activation of the specific mode of operation may be performed by a program shift, e.g. initiated via a user interface, e.g. implemented as an APP on a remote control device, e.g. a smartphone or other wearable device. In an embodiment, the light sensitive sensor (e.g. a camera) is only activated, when the hearing device is brought into the specific mode of operation. In an embodiment, the light sensitive sensor (e.g. a camera) is activated in a low-power mode (e.g. a camera with reduced frame rate), when the hearing device is not in the specific mode of operation.

The substrate further comprises a configurable signal processor (DSP, e.g. a digital signal processor, e.g. including a processor (e.g. PRO in FIG. 2A) for applying a frequency and level dependent gain, e.g. providing beamforming, noise reduction (including improvements using the camera), filter bank functionality, and other digital functionality of a hearing device according to the present disclosure). The configurable signal processor (DSP) is adapted to access the memory (MEM) and for selecting and processing one or more of the electric input audio signals and/or one or more of the directly received auxiliary audio input signals, and/or the camera signal based on a currently selected (activated) hearing aid program/parameter setting (e.g. either automatically selected, e.g. based on one or more sensors, or selected based on inputs from a user interface). The mentioned functional units (as well as other components) may be partitioned in circuits and components according to the application in question (e.g. with a view to size, power consumption, analogue vs. digital processing, etc.), e.g. integrated in one or more integrated circuits, or as a combination of one or more integrated circuits and one or more separate electronic components (e.g. inductor, capacitor, etc.). The configurable signal processor (DSP) provides a processed audio signal, which is intended to be presented to a user. The substrate further comprises a front-end IC (FE) for interfacing the configurable signal processor (DSP) to the input and output transducers, etc., and typically comprising interfaces between analogue and digital signals. The input and output transducers may be individual separate components, or integrated (e.g. MEMS-based) with other electronic circuitry.

The hearing device (HD) further comprises an output unit (e.g. an output transducer) providing stimuli perceivable by the user as sound based on a processed audio signal from the processor or a signal derived therefrom. In the embodiment of a hearing device in FIG. 4, the ITE part comprises the output unit in the form of a loudspeaker (also termed a 'receiver') (SPK) for converting an electric signal to an acoustic (air borne) signal, which (when the hearing device is mounted at an ear of the user) is directed towards the ear drum (Ear drum), where sound signal ($S_{ED}$) is provided. The ITE-part further comprises a guiding element, e.g. a dome, (DO) for guiding and positioning the ITE-part in the ear canal (Ear canal) of the user. The ITE-part further comprises a further input transducer, e.g. a microphone ($M_{ITE}$), for providing an electric input audio signal representative of an input sound signal ($S_{ITE}$) at the ear canal.

The electric input signals (from input transducers $M_{BTE1}$, $M_{BTE2}$, $M_{ITE}$) may be processed in the time domain or in the (time-) frequency domain (or partly in the time domain and partly in the frequency domain as considered advantageous for the application in question).

The hearing device (HD) exemplified in FIG. 4 is a portable device and further comprises a battery (BAT), e.g. a rechargeable battery, e.g. based on Li-Ion battery technology, e.g. for energizing electronic components of the BTE- and possibly ITE-parts. In an embodiment, the hearing device, e.g. a hearing aid, is adapted to provide a frequency dependent gain and/or a level dependent compression and/or a transposition (with or without frequency compression) of one or more frequency ranges to one or more other frequency ranges, e.g. to compensate for a hearing impairment of a user.

Figure 5A:
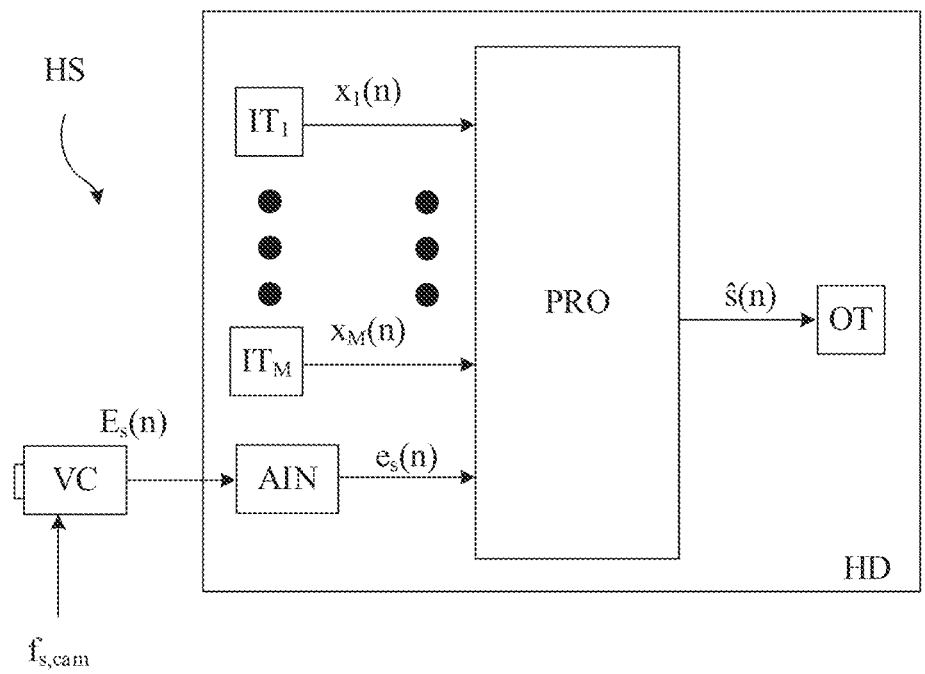
FIG. 5A shows a first embodiment of a hearing aid systems comprising a multitude of input transducers and a video camera.

FIG. 5A shows a first embodiment of a hearing aid (HS) system comprising a hearing device (HD) and a video camera (VC). The hearing system comprises comprising a multitude of input transducers ($IT_1$, ..., $IT_M$) (e.g.—as here—forming part of the hearing device; one or more of the input transducers may e.g. be external to the hearing device, e.g. located in an auxiliary device). The M input transducers (e.g. microphones) each provide respective electric (time-domain) input signals $x_1(n)$, ..., $x_M(n)$ representing sound at the location of the input transducer in question (n representing time, e.g. a time index of a digital signal). The electric input signals $x_1(n)$, ..., $x_M(n)$ from the input transducers ($IT_1$, ..., $IT_M$) and the auxiliary electric signal $e_s(n)$ from the auxiliary input unit (AIN) (connected to the video camera) are fed to processor (PRO) for processing the electric input signals in dependence of the auxiliary electric signal by applying one or more processing algorithms and providing an estimate $\hat{s}(n)$ of a target signal. The estimate of the target signal is feed to the output transducer (OT) for presentation to a user wearing the hearing aid system as stimuli perceivable as sound. Apart from comprising a multitude of input transducers, the embodiment of FIG. 5A comprise the same elements as the embodiment shown in FIG. 2A and described above. The auxiliary input signal $e_s(n)$ provided by the video camera (VC) may be combined in a multitude of ways to enhance one or more, such as all of, or a weighted combination of the multitude of, the electric input signals $x_1(n)$, ..., $x_M(n)$. Two examples thereof are illustrated in FIGS. 5B and 5C and described in the following.

Figure 5B:
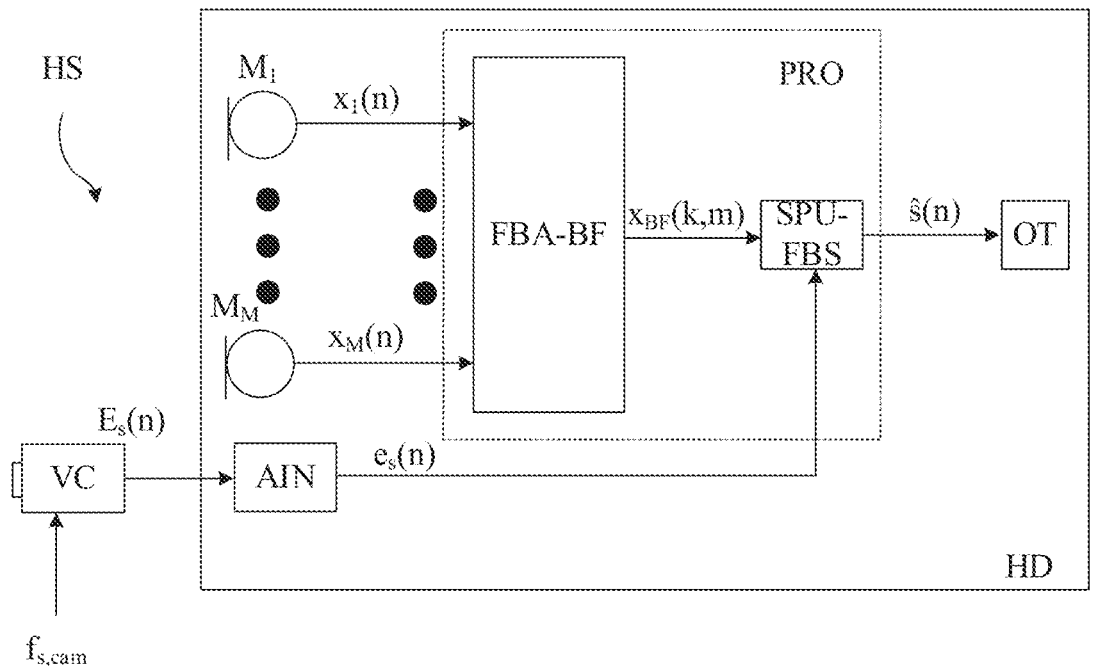
FIG. 5B shows a second embodiment of a hearing aid systems comprising a multitude of input transducers, a beamformer and a video camera, wherein a signal extracted from the video camera is used to enhance the beamformed signal.

FIG. 5B shows a second embodiment of a hearing aid system (HS) comprising a multitude of microphones, a beamformer and a video camera, wherein a signal extracted from the video camera is used to enhance the beamformed signal. The embodiment of FIG. 5B is similar to the embodiment of FIG. 5A apart from the processor being shown to comprise a beamformer and a signal processor, and appropriate analysis and synthesis filter banks for executing processing in frequency sub-bands. The processor (PRO) of the embodiment of a hearing device of FIG. 5B comprises respective analysis filter banks (FBA) for providing respective electric sound signals $x_1(n), \ldots, x_M(n)$ as frequency sub-band signals $x_1(k,m), \ldots, x_M(k,m)$, where k is a frequency index, $k=1, \ldots, K$, and m is a time frame index, $m=1, 2, \ldots$. The processor (PRO) further comprises a spatial filter (beamformer, BF) for providing a beamformed signal $x_{BF}(k,m)$ from the frequency sub-band signals $x_1(k,m), \ldots, x_M(k,m)$. The processor (PRO) further comprises a signal processor (SPU) for applying one or more processing algorithms (e.g. a noise reduction algorithm) to the spatially filtered (beamformed) signal $x_{BF}(k,m)$ and providing an estimate $\hat{s}(k,m)$ of the target signal (the enhanced signal) based thereon. The one or more processing algorithms is/are configured to use the auxiliary electric signal $e_s(n)$ (possibly converted to a time frequency representation $e_s(k,m)$) to provide the enhanced signal $\hat{s}(k,m)$. The processor (PRO) further comprises a synthesis filter bank (FBS, here indicated together with the signal processor (SPU) as SPU-FBS) for converting the time-frequency (frequency sub-band) representation of the estimate of the target signal $\hat{s}(k,m)$ to a time domain signal $\hat{s}(n)$, which is fed to the output transducer (OT) for presentation to the user as an audibly perceivable signal. The signal processor (SPU) may e.g. implement a time-frequency based version of the adaptive filter arrangement or an equivalent solution as shown in FIG. 2B and discussed above. The signal processor may further be configured to apply other processing to the beamformed signal, or a processed version thereof, e.g. to the estimate of the target signal $\hat{s}(k,m)$, e.g. to compensate for a user's hearing impairment.

Figure 5C:
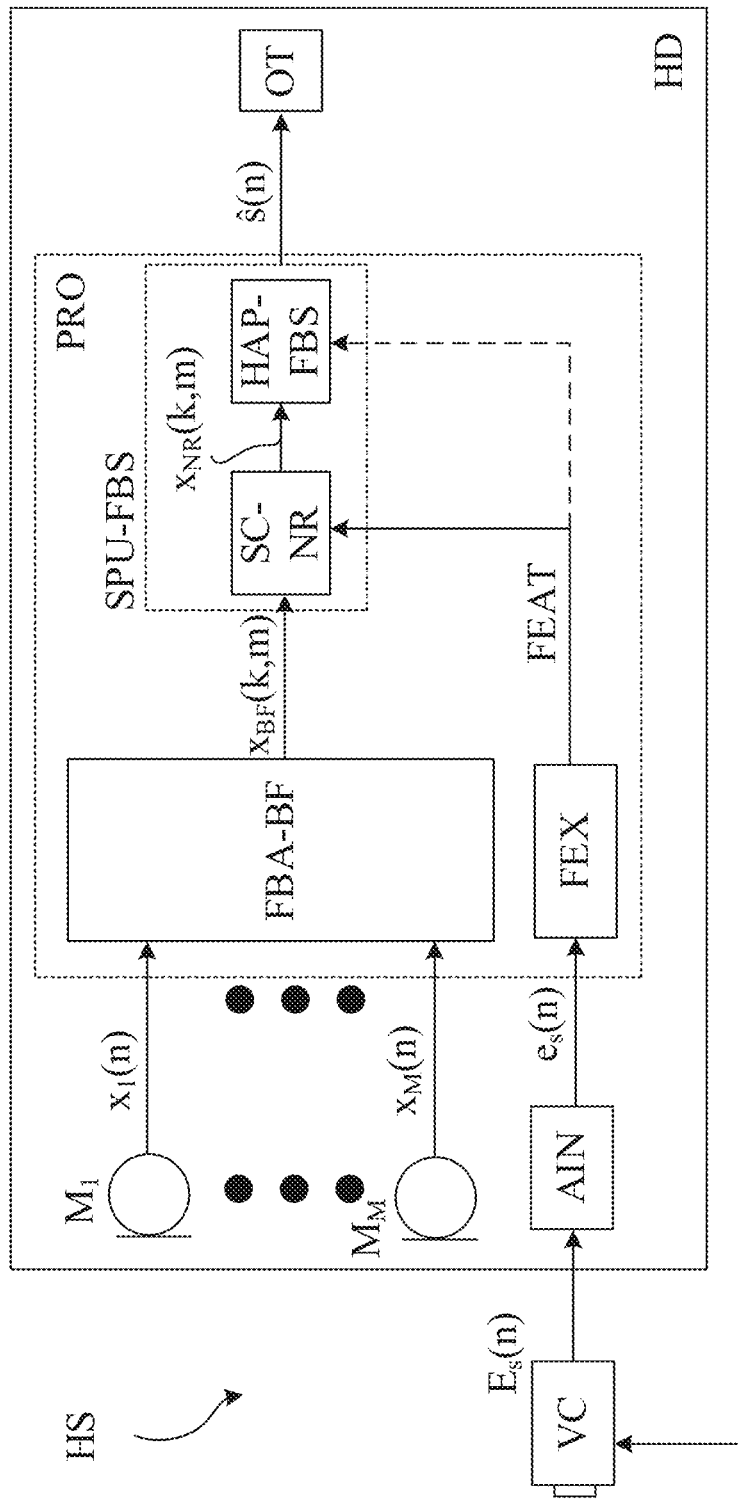
FIG. 5C shows a third embodiment of a hearing aid systems comprising a multitude of input transducers, a beamformer, a single channel noise reduction system, and a video camera, wherein a signal extracted from the video camera is used by the single channel noise reduction system to enhance the beamformed signal.

FIG. 5C shows an embodiment of a hearing aid system (HS) comprising a multitude of microphones, a beamformer, a single channel noise reduction system, a hearing aid processor, and a video camera, and a feature extractor, wherein a signal extracted from the video camera is used to enhance the beamformed signal by using extracted parameters from the auxiliary signal, e.g. a voice activity indicator, as input to the noise reduction system. The embodiment of FIG. 5B is similar to the embodiment of FIG. 5A, apart from the following features. The single channel noise reduction system (SC-NR) is configured to apply a noise reduction algorithm to the beamformed signal $x_{BF}(k,m)$. The feature extractor (FEX) may e.g. be configured to extract from the video signal $e_s(n)$ (or a sub-band version thereof) a voice detection signal indicative of whether or not, or with what probability, the target talker is actively speaking or otherwise uses his voice at a given point in time. The further processing unit (HAP) is e.g. configured to apply other processing algorithms to the noise reduced signal, e.g. a level and frequency dependent gain (or attenuation) to compensate for a user's hearing impairment. The feature extractor (FEX) may be configured to extract other characteristics of the target sound signal from the auxiliary signal $e_s(n)$, e.g. a fundamental frequency, which may be used as input to one or more of the processing algorithms (as e.g. indicated by the dashed arrow to the hearing aid processor (HAP) in FIG. 5C). The fundamental frequency may e.g. be used as an indicator of a particular voice class of the target talker (e.g. male, female or a child). The indicator may e.g. be used to select a set of processing parameters in dependence of the determined fundamental frequency (such processing parameters being e.g. related to gain, compression, directionality, noise reduction, etc., the frequency dependency of different processing algorithms being e.g different in dependence of the voice class (fundamental frequency), cf. e.g. EP2081405A1.

In the example of FIG. 2A-2D above, an adaptive filter solution to the problem of enhancing a microphone signal picked up at the hearing aid user, using a throat (or cheek or chin) video as side information has been disclosed. Obviously, (deep) neural network solutions may be envisioned, which are trained to produce as output an enhanced microphone signal based on an input consisting of the noise microphone signal(s) and the video signal.

Figure 6:
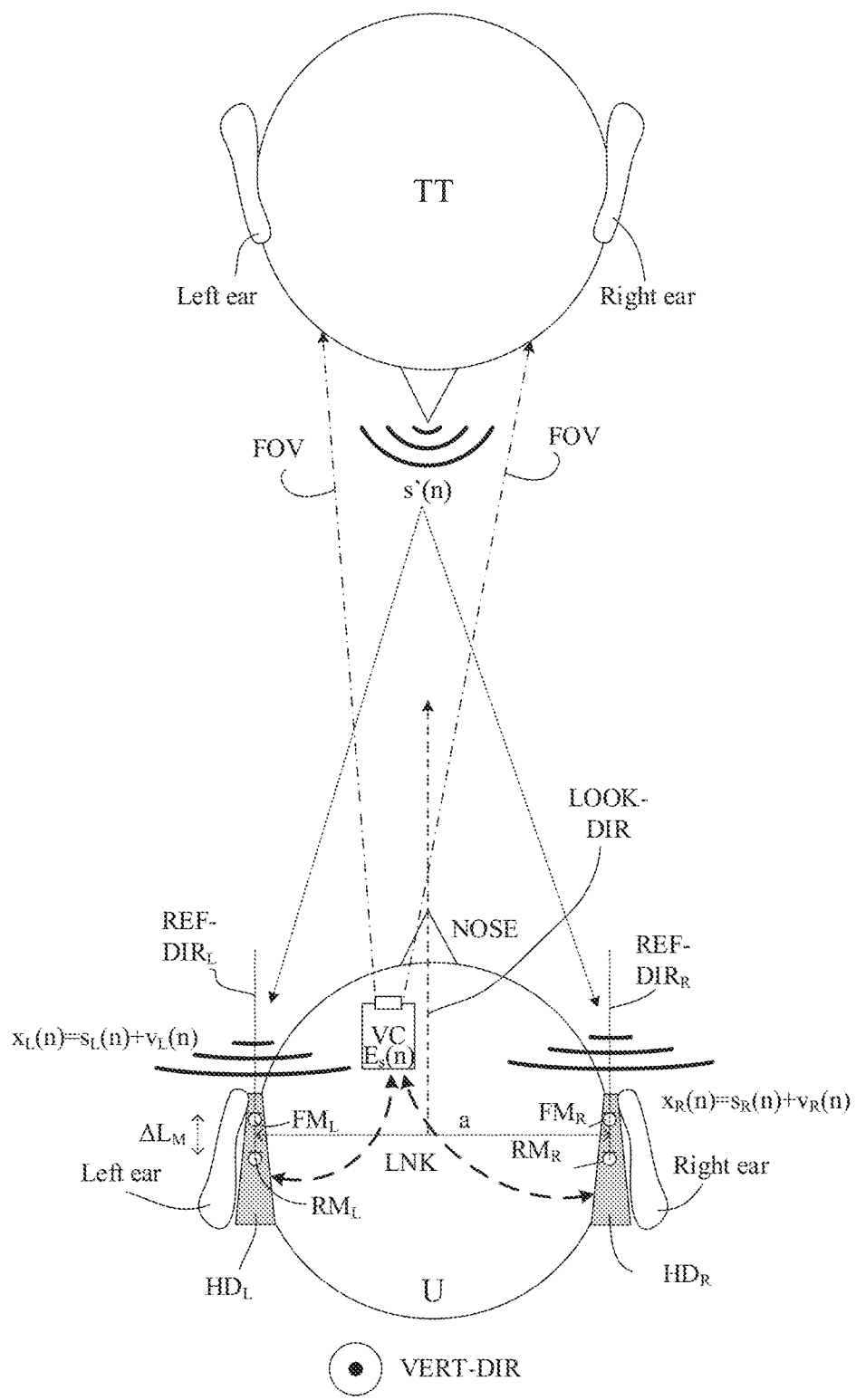
FIG. 6 shows an embodiment of a binaural hearing system according to the present disclosure, and FIG. 7A schematically illustrates a time segment of an exemplary (clean) sound element (vocal a), e.g. 100 ms, at the mouth of the speaker, FIG. 7B schematically illustrates a time segment of an exemplary (clean) sound element (vocal a), e.g. 100 ms, at the vocal cords of the speaker, and FIG. 7C schematically shows spectra of the sound element /a/ corresponding to FIG. 7A (at the mouth of the speaker), to FIG. 7B (at the vocal cords of the speaker), and as recorded by a hearing aid microphone (including environment noise).

FIG. 6 shows an embodiment of a binaural hearing system according to the present disclosure. The scenario illustrated in FIG. 6 is similar to the one illustrated in FIG. 1A. A difference is that the user wears hearing devices at left as well as at right ears. Both hearing devices may be in communication with the video camera (VC) via respective wired or wireless links (LNK). Further (or alternatively), the left and right hearing devices ($HD_L$, $HD_R$) may be equipped with appropriate transceiver circuitry to allow communication (e.g. via an inter-aural link) to be established between them to thereby allow data (e.g. from the video camera) to be transferred from one hearing device to the other (possibly via an intermediate device). A further difference is that both hearing devices comprise two microphones, termed a front ($FM_L$, $FM_R$) and a rear ($RM_L$, $RM_R$) microphone, respectively, referring to the front and rear directions relative to the user's face (nose). The two (or more) microphones of a given hearing device may be used to create beamformed signals, e.g. focusing on a target direction, e.g. the look direction of the user (as indicated by the dashed arrow through the user's nose (NOSE) (by definition) pointing in a 'front' direction). The distance between the two hearing devices and thus the respective microphones is indicated by parameter a (e.g. of the order of 0.15-0.30 m). The hearing aid microphones of the left and right hearing devices ($HD_L$, $HD_R$) may be used to provide 'separate', local beamforming in each hearing device (only based on its 'own' microphones) and/or to provide binaural beamforming based on microphone(s) from both bearing devices. The FIG. 7A schematically illustrates a time segment of an exemplary (clean) sound element (vocal a), e.g. of length of the order of 100 ms, at the mouth of the speaker.

Figure 7A:
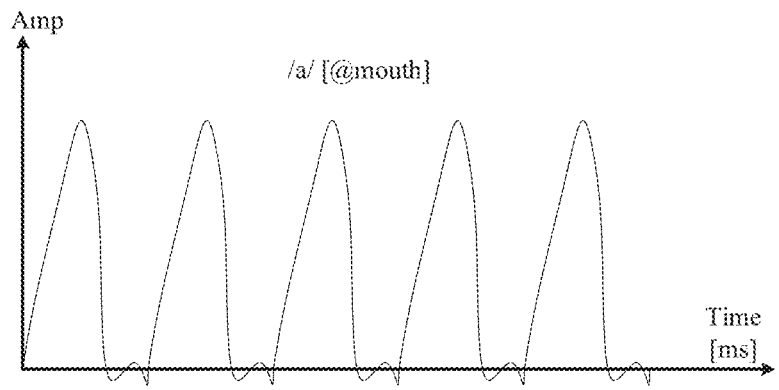
Figure 7B:
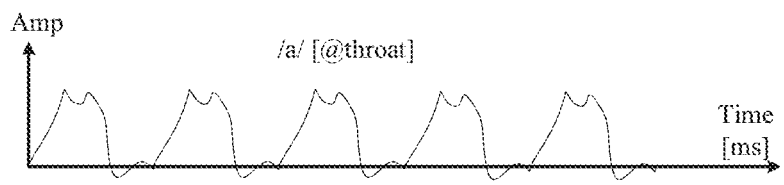

FIG. 7B schematically illustrates a time segment of an exemplary (clean) sound element (vocal a), e.g. of length of the order of 100 ms, at the vocal cords of the speaker.

Figure 7C:
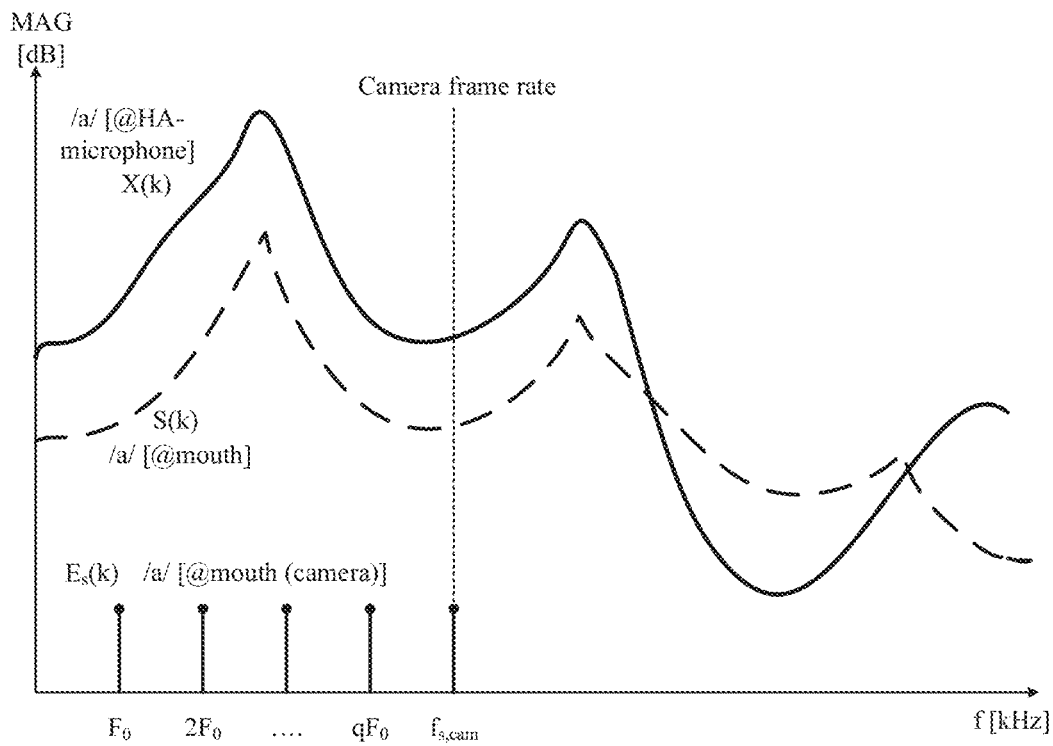

The middle part of FIG. 7C in dashed, bold line schematically shows a spectrum S(k) of the (clean) sound element /a/ (at the mouth of the speaker) corresponding to FIG. 7A. The top part of FIG. 7C in solid, bold line further schematically shows a spectrum X(k) of (noisy) sound element /a/ as recorded by a hearing aid microphone (including environment noise). The bottom part of FIG. 7C further schematically shows a (line) spectrum $E_s(k)$ of the (clean) sound element /a/ (at the vocal cords of the speaker) corresponding to FIG. 7B. The line spectrum represents a fundamental frequency $F_0$ (and harmonics thereof $qF_0$), $q=2, 3, \ldots$). The vertical dotted line in FIG. 7C, denoted $f_{s,cam}$, indicates the frame rate of the camera. The frame rate of the camera $f_{s,cam}$ is related to the cut-off frequency, $f_{cut}$, of the low-pass and the high-pass filters of FIG. 2A-2D, i.e. a limit between a low frequency region (LF) and a high frequency range (HF). The cut-off frequency, $f_{cut}$, may for example, be smaller than or equal to the frame rate of the camera, $f_{s,cam}$. The cut-off frequency, $f_{cut}$, may e.g. be set to half of the camera frame rate ($f_{cut}=f_{s,cam}/2$). The (video) camera may have a frame rate ($f_{s,cam}$) in the range between 250 Hz and 1 kHz. The camera may be a high-speed video camera, e.g. having a frame rate larger than 1 kHz, such as larger than 2 kHz. Fundamental frequencies ($F_0$) of the vocal tract of human beings during vocal utterances (e.g. speech) are typically in the range between 50 Hz and 550 Hz.

Average fundamental frequencies are different for male, female and child species. Male fundamental frequencies are e.g. typically in the range from 85 Hz to 165 Hz, see e.g. EP2081405A1. During speech, the vocal cords (and its immediate surroundings, e.g. skin, tissue and bone) will at least vibrate with the fundamental frequency $F_0$, but higher harmonics ($F_q = qF_0$) will also be excited and be present in the user's speech signal together with a number of formant frequencies determined by the resonance properties (e.g. its form and dimensions) of the vocal tract of the target talker. For the purposes of signal processing in hearing aids, speech frequencies are generally taken to lie in the range below 8-10 kHz. A majority of speech frequencies of importance to a user's intelligibility of speech are below 5 kHz, and mainly below 3 kHz, such as below 2 kHz. At least some of these frequencies (a low-frequency part<$f_{cut}$ (here=$f_{s,cam}$)) will create corresponding vibrations in the facial region of the talker and be extractable by a video camera (including or) focused on the facial region (e.g. the throat and/or cheek or chin regions).

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

REFERENCES

[1] A. Davis et al., "The Visual Microphone: Passive Recovery of Sound from Video," ACM Transactions on Graphics (Proc. SIGGRAPH), Vol. 33, No. 4, pp. 79:1-79:10, 2014.
[2] Z. Zalevsky et al., "Simultaneous remote extraction of multiple speech sources and heart beats from secondary speckles pattern", Optics Express, Vol. 17, No. 24, pp. 21566-21580, 2009.
[3] M. A. Shabani et al., "Local Visual Microphones: Improved Sound Extraction from Silent Video," 2017.
[4] P. Jax and P. Vary, "Artificial bandwidth extension of speech signals using mmse estimation based on a hidden markov model," Proc. Icassp 2003.
[5] J. R. Deller, J. H. L. Hansen, and J. G. Proakis, "Discrete-Time Processing of Speech Signals," IEEE Press, 2000.
[6] P. C. Loizou, "Speech Enhancement—Theory and Practice," CRC Press, 2007.
[7] R. C. Hendriks, T. Gerkmann, J. Jensen, "DFT-Domain Based Single-Microphone Noise Reduction for Speech Enhancement," Morgan and Claypool, 2013.Xxxxx
EP3028475A1 (STARKEY) Feb. 5, 2015
EP3267697A1 (OTICON) Jan. 10, 2018
EP2081405A1 (BERNAFON) Jan. 21, 2008
EP3185590A1 (OTICON) Jun. 28, 2017

The invention claimed is:

1. A hearing device configured to be worn by a user or to be fully or partially implanted in the head of the user, the hearing device comprising:
  at least one input transducer for converting a sound comprising a target sound from a target talker and possible additional sound in an environment of the user, when the user wears the hearing device, to an electric sound signal representative of said sound,
  an auxiliary input unit configured to provide an auxiliary electric signal representative of said target sound or properties thereof,
  a processor connected to said input transducer and to said auxiliary input unit, said processor being configured to apply a processing algorithm to said electric sound signal, or a signal derived therefrom, to provide an enhanced signal by attenuating components of said additional sound relative to components of said target sound in said electric sound signal, or in said signal derived therefrom, wherein
  said auxiliary electric signal in the form of a vibration signal is derived from a video signal from a camera providing visual information containing information of current mechanical vibrations of a facial or throat region of said target talker originating from the vocal cord of the target talker, and wherein said processing algorithm is configured to use said auxiliary electric signal in the form of a vibration signal or said signal derived therefrom to provide said enhanced signal.

2. A hearing device according to claim 1 comprising a light sensitive sensor for providing said visual information.

3. A hearing device according to claim 1 comprising a camera for providing said visual information.

4. A hearing device according to claim 3 comprising a carrier whereon said camera is mounted.

5. A hearing device according to claim 4 wherein said carrier comprises a housing of the hearing device, a spectacle frame, or a boom of a headset, an article of clothing, or a clip.

6. A hearing device according to claim 1 comprising a user interface allowing a user to indicate a direction to or a location of a target talker of current interest to the user.

7. A hearing device according to claim 1 comprising a filter bank for decomposing the electric sound signal in frequency sub-bands, at least providing a low-frequency part and a high-frequency part of the electric sound signal.

8. A hearing device according to claim 7 comprising an adaptive filter and a combination unit for estimating a low-frequency part $\hat{s}_{LF}$ of the enhanced signal from said low frequency part $x_{LF}$ of the electric sound signal and said auxiliary electric signal $e_s$.

9. A hearing device according to claim 8 comprising a synthesis filter bank or a sum unit for providing said enhanced signal $\hat{s}$ from said low-frequency part $\hat{s}_{LF}$ and a high-frequency part $\hat{s}_{LF}$ of the enhanced signal.

10. A hearing device according to claim 1 comprising a voice activity detector for providing a voice activity indicator representing an estimate of whether or not, or with what probability, an input signal comprises a voice signal at a given point in time, and wherein said voice activity indicator is determined in dependence of said auxiliary electric signal or said signal derived therefrom.

11. A hearing device according to claim 1 comprising a face tracking algorithm to extract features of the face region of a person in a field of view of the camera.

12. A hearing device according to claim 1 comprising an output unit for providing stimuli perceivable as sound to a user based on said enhanced signal $\hat{s}$.

13. A hearing device according to claim 1 configured to provide that the use of the auxiliary electric signal in the providing of the enhanced signal is only enabled, when vibrations in the facial or throat region are above a certain threshold taken to be due to the person having activated the vocal cords, and hence is talking.

14. A hearing device according to claim 1 being constituted by or comprising a hearing aid, a headset, an earphone, an ear protection device or a combination thereof.

15. A method of operating a hearing device configured to be worn by a user or to be fully or partially implanted in the head of the user, the method comprising:

converting a sound comprising a target sound from a target talker and possible additional sound in an environment of the user, when the user wears the hearing device, to an electric sound signal representative of said sound, providing an auxiliary electric signal representative of said target sound or properties thereof, applying a processing algorithm to said electric sound signal, or a signal derived therefrom, to provide an enhanced signal by attenuating components of said additional sound relative to components of said target sound in said electric sound signal, or in said signal derived therefrom, deriving said auxiliary electric signal in the form of a vibration signal from a video signal from a camera providing visual information containing information of current mechanical vibrations of a facial or throat region of said target talker, and using said auxiliary electric signal in the form of a vibration signal or said signal derived therefrom to provide said enhanced signal.

16. A hearing aid system, comprising a hearing device according to claim 1 and an auxiliary device, the hearing system being adapted to establish a communication link between the hearing device and the auxiliary device to provide that information can be exchanged or forwarded from one to the other.

17. A hearing aid system according to claim 16 wherein the auxiliary device is or comprises the light sensitive sensor.

18. A hearing aid system according to claim 16 wherein the auxiliary device is or comprises a remote control, a smartphone, or other portable or wearable electronic device.

19. A hearing aid system according to claim 16 wherein the auxiliary device is or comprises another hearing device and wherein the hearing system implements a binaural hearing system.

* * * * *